United States Patent [19]

Carpenter et al.

[11] Patent Number: 5,544,345
[45] Date of Patent: Aug. 6, 1996

[54] COHERENCE CONTROLS FOR STORE-MULTIPLE SHARED DATA COORDINATED BY CACHE DIRECTORY ENTRIES IN A SHARED ELECTRONIC STORAGE

[75] Inventors: Kelly S. Carpenter, Fremont; Gerard M. Dearing, San Jose, both of Calif.; Jeffrey M. Nick, Fishkill, N.Y.; Jimmy P. Strickland, Saratoga, Calif.; Michael D. Swanson, Poughkeepsie; Wendell W. Wilkinson, Hyde Park, both of N.Y.

[73] Assignee: International Business Machines Corporation, Armonk, N.Y.

[21] Appl. No.: 148,707

[22] Filed: Nov. 8, 1993

[51] Int. Cl.$^6$ .............................. G06F 13/00; G06F 13/14
[52] U.S. Cl. ........................ 395/477; 395/474; 395/468; 364/DIG. 1; 364/228.1
[58] Field of Search ................................ 395/490, 439, 395/440, 477, 479, 726, 468, 469, 474, 457

[56] References Cited

U.S. PATENT DOCUMENTS

| | | | |
|---|---|---|---|
| 4,197,580 | 4/1980 | Chang et al. | 364/200 |
| 4,984,153 | 1/1991 | Kregness et al. | 364/200 |
| 5,408,653 | 4/1995 | Josten et al. | 395/600 |
| 5,423,044 | 6/1995 | Sutton et al. | 395/725 |

Primary Examiner—Eddie P. Chan
Assistant Examiner—Kevin L. Ellis
Attorney, Agent, or Firm—Bernard M. Goldman

[57] ABSTRACT

A high-speed cache is shared by a plurality of independently-operating data systems in a multi-system data sharing complex. Each data system has access both to the high-speed cache and to lower-speed, upper-level storage for obtaining and storing data. Management logic in the shared high-speed cache is provided to meet the serialization and data coherency requirements of the data systems when sharing the high speed cache as a store-multiple cache in a multi-system environment.

12 Claims, 22 Drawing Sheets

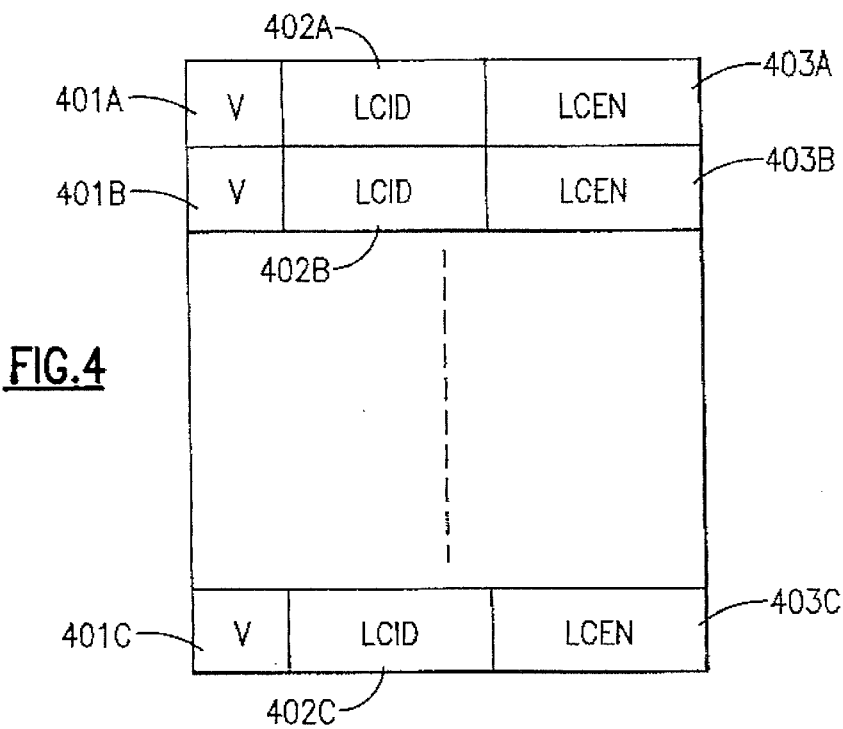
FIG.4
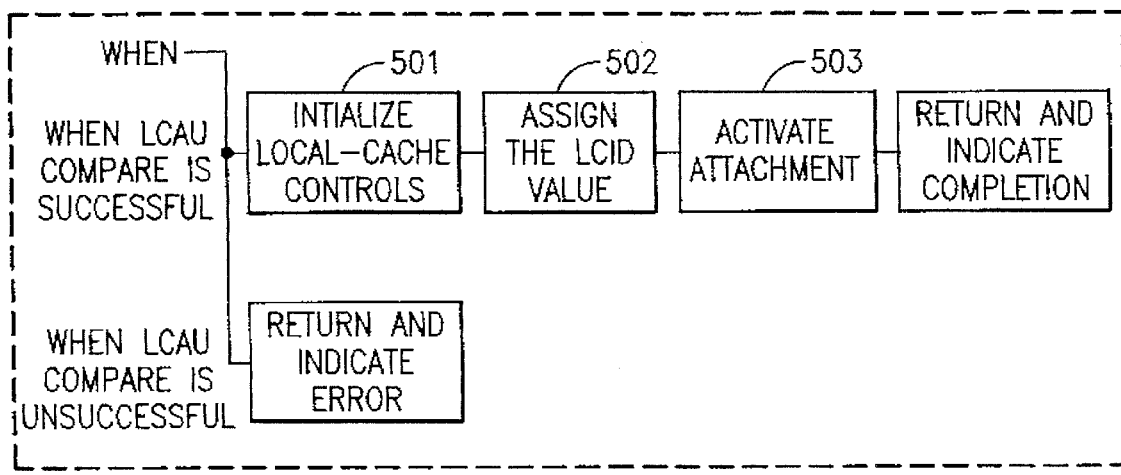
FIG.5
DIRECTORY-ENTRY INFORMATION BLOCK
| NAME | CHANGE INDICATOR | CASTOUT CLASS | CASTOUT LOCK | CASTOUT LOCK STATE |
|------|------------------|---------------|--------------|---------------------|
FIG.8

COHERENCE CONTROLS FOR STORE-MULTIPLE SHARED DATA COORDINATED BY CACHE DIRECTORY ENTRIES IN A SHARED ELECTRONIC STORAGE

SPECIFICATIONS INCORPORATED BY REFERENCE

The entire specifications of the following listed applications are completely incorporated by reference as part of the subject application. Each of the following listed applications is owned by the same assignee as the subject application. They are:

"Sysplex Shared Data Coherency Method and Means" by D. A. Elko et al, Ser. No. 07/860,805, pending;

"Storage Element For A Shared Electronic Storage Cache" by D.A. Elko et al, Ser. No. 07/860,807, pending;

"Management of Data Movement from a SES Cache to DASD" by D. A. Elko et al, Ser. No. 07/860,806 now U.S. Pat. No. 5,493,668;

"Communicating Messages Between Processors and a Coupling Facility" by D. A. Elko et al Ser. No. 07/860,380, pending; and "Message Path Mechanism For Managing Connections Between Processors and a Coupling Facility" by D. A. Elko et al, Ser. No. 07/860,646, pending;

"Management Of Data Objects Used To Maintain State Information For Shared Data At A Local Complex" by J. A. Frey et al, Ser. No. 07/860,797, now U.S. Pat. No. 5,388,266;

"Method And Apparatus For Coupling Data Processing Systems" by D. A. Elko et al, Ser. No. 07/860,803, now U.S. Pat. No. 5,317,739.

INTRODUCTION

This invention provides mechanisms and controls for using a shared electronic storage (SES) device as a store-multiple shared cache. The invention concerns the cache coherency, serialization and recovery constructs associated with SES cache store-multiple protocols. The term "store-multiple" cache is meant to convey a caching model wherein updates to data are made by writing the modified data to the SES cache and then writing the modified data to the backing DASD as well.

BACKGROUND

A shared external storage (SES) in a sysplex is disclosed in previously-filed patent applications Ser. Nos. 07/860,805, 07/860,807, 07/860,806, and 07/860,803.

The referenced patent applications disclose mechanisms which allow a SES cache to be shared across one or more Central Processing Complexes (CPC's), providing cache coherency and storage management functions which support utilization of the SES cache as a "store-in" cache. As used here, the term "store-in" cache is meant to convey a caching model wherein updates to data are made by writing the data to the SES cache in a "changed" state, reflecting the fact that the SES data element contents are more current than the copy of the data on backing sysplex DASD. The changed state for the data element is conveyed to the SES by setting the change bit command operand for the Write When Registered (WWR) or Write And Register (WAR) commands to the changed state. Once the updated data is stored in the SES cache, the write operation is considered complete without first requiring the update to be written to DASD.

In the store-in model, changed data is periodically cast-out from the SES cache to the backing DASD storage. This is achieved by reading the data for a changed SES entry into local CPC memory via a Read For Castout command, which sets the castout lock in the SES directory entry and resets the change bit in the SES directory entry to the unchanged state. Then the data is written to DASD. Finally, the castout lock is released via the Unlock Castout Locks command.

The castout process is independent of, and not serialized against, mainline program read or write access to data resident in the SES store-in cache. While a version of the data element in the SES is in the process of being retrieved and castout to DASD, concurrent writes of new updates are allowed to proceed against the SES data element, as are read operations which may fetch an updated version of the data before the castout of the prior version is completed.

However, it is necessary to serialize the castout process against another castout process for the same data element. If this were not provided, a castout process which fetched an earlier version of the data element might not complete its I/O operation to DASD until after a later castout process had fetched a more-current version of the data and succeeded in writing that version to DASD first. In such a scenario the more recent update of the data would be lost. The SES store-in cache castout mechanism described in the referenced art provides a SES entry-level castout serialization function, which is defined as being "non-blocking" with respect to non-castout read/write operations against the same data element.

The provided entry-level castout serialization scope supports programs which provide record-level locking protocols for write operations (allowing concurrent write operations to proceed against different records in the same page), avoiding the necessity to obtain a page-level or higher locking scope when performing castout of data to DASD.

With respect to maintaining data coherency for data pages written in a changed state to the SES store-in cache, the aforementioned record-level update locking programs still rely on entry-level data coherency controls to prevent down-level versions of the data page from being written to a SES data element. Such controls are provided through use of the Read And Register (RAR) command and the Write When Registered (WWR) command as described in patent application Ser. No. 07/860,805. Once a program registers interest in a SES directory entry via the Read And Register command, retrieving the then-current copy of the associated data element from the SES cache, that program will be allowed to write back an updated version of the page to the SES as long as the program still has a valid registered interest in the SES directory entry for that data. If a second program has successfully written an updated version of the page (modifying a different record in the page) via the WWR command since the first program issued its RAR command for the data, the attempt to then write the down-level version of the page by the first program will fail. This is due to the successful execution of the Write When Registered command by the second program, having specified the data should be written in a changed state. As a result, the WWR command execution of the second program causes all registered interest in the directory entry for the data element by all sharing programs other than the WWR command issuer to be de-registered and a cross-invalidate signal to be issued to each of the other registered users to invalidate their local cache buffer copies of the data element.

It can thus be demonstrated in the referenced patent applications, in particular Ser. Nos. 07/860805 and 07/860,806 that the SES store-in cache model provides the entry-level cache coherency and castout serialization scope to support exploitation by data base manager programs that implement locking for update with a record-level serialization scope.

The following background information details pertinent aspects of a sysplex configuration providing SES caching functions as disclosed in the referenced patent applications.

Sysplex Hardware Structure:

FIG. 1 shows a representation of a sysplex system. It contains a plurality of computer processing complexes (CPCs) from CPC-1 to CPC-M which represent any number of CPCs from one to a large number, all being connected to one or more SES (shared electronic storage) device (of which one SES device 101 is shown in FIG. 1).

Each CPC is of the type shown in FIG. 2, which may be a multiprocessor such as the presently commercial IBM ES/9000 model 900 which is designed according to the IBM ESA/390 architecture specified in the Enterprise Systems Architecture (ESA)/390 Principles of Operations (POP), which is orderable from IBM by form number SA22-7201-00, and is incorporated herein by reference in its entirety. Each CPC has one or more operating systems. If any CPC has more than one operating system, its resources are logically partitioned among plural operating systems using the IBM PR/SM feature. Inter-system channels (ISCs) are connected between SES (101) and CPCs 1 through M. An ISC (106-1 thru 106-M) connecting to a CPC communicates signals to/from microcode/hardware in the CPC.

Each CPC in the sysplex operates with a storage hierarchy, which for example may include a private high-speed hardware cache in each CPU of a CPC (201-1 and 201-N), a shared hardware cache accessible to all of the private processor caches (202), a main storage (termed central storage in other literature) (MS) shared by all processors in the CPC (204), a hardware storage area (HSA) associated with MS but not having MS addressability (205) and an expanded storage ES (206). However, the DASD is grouped by DASD controls that allow any CPC in the sysplex to access any DASD in the group, which is referenced herein by the term "sysplex DASD" (207).

The MS/ES storage combination may be considered as a single random access storage unit internal to the CPC. This is because the concept is used in which pages (4 kilobyte units) in MS are backed by ES and DASD pages, which can be swapped by programs using instructions, such as "pagein/pageout" or "move page" to quickly move pages back and forth between MS, ES to eliminate the need to distinguish between records in ES or MS when they belong to the same user operation, and they may be viewed as being in the same CPC cache.

An expanded storage (ES) 206 is connected to the MS 204, and stores data which is addressed in 4 KiloByte page units. A DASD director 207 is connected to the MS (204) for controlling the storing of data on disk storage devices, DASD-1 through DASD-K. The DASD directory 207 controls the data flows between all CPCs in the sysplex and all the DASD in the illustrated bank of DASD, so that any CPC can access any record on any DASD, including records written by other CPCs in the sysplex. Each of these storages has a speed/capacity characteristic which places it at the position shown in the illustrated storage hierarchy.

A sysplex may have any mix of OSs running on its different CPCs, some CPCs each having one OS, and other CPCs each having a plurality of OSs running independently of each other. One or more subsystems may be running under any OS in any CPC, including the IBM DB2, DFP, IMS, VSAM, etc. subsystems.

Different copies of the same data base subsystem program may be running simultaneously and independently in the different CPCs. These different programs may be accessing the same or different data elements or records in the data base, which may simultaneously be in MS/ES local caches (LCs) of the different CPCs.

The CPC/SES physical connection (208) may be provided by a respective channel connected at one end to an MS controller in a respective CPC, and connected at its other end to a SES device. The respective channel bus may be made of a serial optical fibers. The bus may be a single fiber, but it may be made of a plurality of fibers operating in parallel by "striping" (interleaving) data among them.

In a hardware sense, a SES may be considered to be a large random access memory that may be used in common by all CPCs connected to the SES. The connected CPCs may use the SES to store shared data records and files on a temporary or semi- permanent basis. Hence, SES may be considered to be a component of the storage hierarchy in the system, having a hierarchy level common to all CPCs attached to the SES, and roughly corresponding to the ES level in the CPCs.

In a sysplex, one or more SES entities may be physically connected to the MS/ES in every CPC in the sysplex. It is not required that all CPCs in a sysplex be connected to a SES. For example, a SES may be attached only to a subset of CPCs operating the same programming subsystem. And different subsets of CPCs may be connected to different SESs in a sysplex for running different programming subsystems.

SES may be used as a high-speed cache for data normally stored in the sysplex common DASD, although the CPC/SES/DASD physical connections may not be in a direct hierarchical path. Any CPC in the sysplex can access a record much faster from SES than it can from the common DASD storage. That is, a data element or record can be quickly accessed in SES without the electro-mechanical delays found with DASD, such as waiting for head movement between tracks and waiting for track spin to reach a requested DASD record.

Special commands are provided to allocate the SES cache. Also, a plurality of caches may be allocated within the same SES, such as having a respective cache handle the data shared by attached subsets of CPCs using different programs.

Each SES cache includes a directory (102), data area (103), local cache register (104), and cache controls (105). If the data area part of the cache is not going to be used, it may be made zero in size. Each valid directory entry in a SES cache contains a name of a data element registered in SES by any of its attached CPCs. SES may or may not contain a copy of the data named in the registered element. The SES registered name is also the name of one or more copies of the data element in one or more CPCs in the sysplex. Furthermore, this directory name also identifies a copy of the data element stored in (or to be stored in) one of the DASDs 1-K in the bank of DASD connected to director 207.

The data element name is used by SES to control data coherence for the data element regardless of whether the data element is stored in the SES. The data element name must be registered in SES for SES to provide data coherence for the data element in the sysplex. It is not necessary to store the data element itself in SES for SES to provide data coherence.

Maintaining Shared Data Coherency:

Patent application Ser. No. 07/860,805 describes a store-in cache approach having program controlled caches (buffers) in the memories of different central processing complexes (CPCs) and in one or more shared electronic storage (SES) entities. The size of any of these caches may be different from each other and may be changed without changing the hardware structures of the entities containing the caches. Data coherence is maintained among these caches. Moreover, the set of caches may reside on all or a subset of CPCs with connections to a SES cache. Data coherence is maintained among all local caches that have attached to the SES cache via an explicit attach-local-cache command executed for each local cache when the local cache is created and continues until the local cache is detached. The number of local caches may change over time.

Patent application Ser. No. 07/860,805 further describes a method and structure in a shared data, multi-computer system which guarantees that any page of data in a shared cache (aka SES) will not be overwritten by an earlier version of that page obtained from any other shared data storage resource. In a multi-system, data-sharing complex, a database system executing on a first computer system could be caching an updated page in a shared cache while another database system could be trying to cache a down-level copy of the same page obtained from a DASD. The described mechanisms detect such a condition and, without a serialization mechanism such as locking, bars entry of the down-level copy obtained from the DASD.

Local Cache Structure:

The executing program in any CPC uses one or more allocated local cache buffers (LCBs 0-N of 107A, 0-K of 107B, and 0-L of 107C) in the local caches (107A, 107B, and 107C) of the CPC's MS/ES to contain the data elements and records in recent use that have been generated, backed-up, retrieved and/or stored- in by the CPC. And any CPC in the sysplex may have more than one type of program (for example DB2 and IMS) currently executing on the central processors and I/O processors of that CPC. Then, these plural executing programs in a CPC may have their own LCBs allocated in the CPC's MS/ES which contain their most recently accessed data elements and records. Hence, a complexity of different LCBs may be used by different types of programs, and they may simultaneously exist in the MS/ES of any one or more CPCs in a sysplex. The term "local cache" (LC) is used herein to refer to a collection of LCBs set up and used by a CPC programming subsystem.

The allocation and size of each LCB is dependent on the respective program being used in the CPC. The LCBs may have different sizes and different numbers in the different LCs. Any local cache buffer may be changed to a different size during program execution.

Invalidation signalling controls in SES are provided to request the coherence of data shared among the MS/ES buffers in the different CPCs, so that each CPC may determine the validity of local cache buffers when access to the data contained in a buffer is requested by programming. During initialization of a local cache, operating system services are invoked to authorize access of the program to the SES cache. These operating system services assign a local cache identifier to be used to uniquely identify the local cache and its attachment to the SES cache.

A local cache is attached to a SES cache through execution of the Attach Local Cache (ALC) command. The ALC command identifies the local cache to the SES cache structure, initializes the local-cache controls, and assigns the specified local-cache identifier (LCID), which is saved in the local cache controls (105). Local cache controls are used by SES to maintain information regarding each attached local cache.

When the connection between a local cache and the SES cache is no longer required, either as a result of normal or abnormal termination cleanup, the Detach Local Cache (DLC) command is executed. The DLC command cleans up resources in the SES cache associated with the store-in local cache and, if requested, releases the LCID for re-use.

The operating system services also invokes a CPU instruction (define vector DV) to cause a bit vector (termed a coherence vector (V)) to be created (108A, 108B, and 108C) in the Hardware System Area (HSA). Completion of the instruction to define this coherency bit vector returns a local cache token (LCT). A new entry for each new coherence vector bit is placed in an HSA table T (209) (shown as table T in HSA 205 in FIG. 2) to represent the locations of the new coherence vector bits in the HSA associated with a particular LC in the CPC. The LCT and LCID are provided to SES by the operating system when a local cache is attached to the SES cache and stored in the local cache controls (105).

A local cache is managed in its CPC by a local cache directory (LCD) comprised of a plurality of entries which contain pointers (addresses) to respective LCBs accessed through the respective LCD entries. Any CPC is able to store a data element in each LCB and assign a unique name to the data element; the name is put into the LCD entry associated with the LCB. This data element name is used to communicate with SES as the address of the data element when it is registered in SES, regardless of the size of the data element. The operating system service invoked to interface with the SES uses a CPU instruction (set vector entry SVE) to set the coherence vector bit when the name of a data item is successfully registered at the SES cache.

When a local cache buffer contains a data element shared among the CPCs in the sysplex, programming associates a bit in the coherency vector with the LCB. The entry within the coherency vector is termed the local cache entry number (LCEN). Each LCD entry has a respective local cache entry number (LCEN) which is used by the CPC and SES to distinguish between the LCBs of a local cache. Each LCD entry indicates the valid/invalid state of its LCB contents.

The CPC is physically connected to a SES through a storage controller (not shown) to its MS 204 and HSA 205. This storage controller has microcode addressability to HSA 205 for accessing a vector bit position in HSA by LCT and LCEN values being signalled by the channel (208 in FIG. 2 and 106-1 thru 106-M in FIG. 1) from the attached SES. A table (T in FIG. 2 at 209) in the HSA 205 translates the LCT/LCEN values received from the channel into a corresponding coherence vector bit position in HSA.

Local Cache Coherency:

The mechanisms described in patent application Ser. No. 07/860,805 prevent multiple-version contamination of sysplex data when plural copies of a data element concurrently exist in different LCBs in the CPCs.

Multiple copies of a record are allowed in different LCBs as long as all CPCs are only reading the records. Contamination occurs when a data element is changed in any LCB when a second copy is allowed to concurrently exist unchanged in any other LCB, since then the two different versions exist for the same data element. Then, any changes made to the second copy will not be cumulative with the changes made to the first copy, making all copies incorrect, including the copy in the common DASD which is not updated until one of the new versions is committed by being stored back to DASD.

This multiple-version data contamination can be avoided if all LCB copies are invalidated except for one LCB copy which is changed. Then, the one remaining copy receives all changes and represents the latest version of the data element existing in any CPC, since only it can receive any changes and only it can be stored back to the common DASD to represent the latest copy of the record in the system.

The avoidance of multiple-version contamination is herein called "maintaining data coherence". Invalidation of all outstanding copies of a record except the copy being changed is the generally accepted solution for preventing multiple- version contamination in a record.

To prevent multiple-version contamination, any CPC, wanting to access (read or write) a record in the sysplex common DASD, must first register the record in a SES directory, and preferably read the record from the SES cache if it exists there.

In FIG. 1, CPC-1 is shown with local caches LC-1 and LC-2, which have associated coherency vectors V1 and V2, respectively. Note that LC-1 has N number of buffer entries (i.e. LCB-0 through LCB-N), which are respectively associated with coherency vector V1 bits 0-N. And that LC-2 has K number of entries (i.e. LCB-0 through LCB-K), which are associated with V2 bits 0-K. CPC-M is shown with a single LC(1), having LCBs 0-L associated with V(1) coherency bits 0-L.

Different versions may exist of the same record among these multiple copies in their different locations. The latest version exists in SES (if a copy is written in SES), and in the CPC making the last change in the record. Generally, in a store-in cache, DASD copy is a more out-of-date version than the SES copy, because this copy is the last to be updated due to the slow nature of accessing the electro-mechanical DASD.

SES can only set these vector bits to an invalid state through a communication channel between SES and the CPC. When SES sets any coherence vector bit to the invalid state in a CPC's HSA, the CPC programming is not disturbed by such setting when it happens. The CPC programming continues without interruption due to the SES setting of any coherence vector bit. It is up to the CPC to determine when it will test the state of the vector bits to determine if any invalidation has be indicated. This manner of operation even gives the CPC the option of not using the sysplex coherence controls if the CPC has a situation in which coherence is not needed.

When programming determines that data in a local cache buffer is to be used, the CPC uses a "test vector entry" (TVE) CPU instruction to test the current state of the data coherence bit for that LCB in the CPC. The TVE instruction operates to invoke microcode which based on the specified LCT and LCEN locates the bit in the HSA memory area and test its state. The TVE microcode then records the result of the instruction execution in a condition code (CC) of the instruction for use by subsequent executing instructions in the CPC program that can conform the state of the corresponding LCB valid/invalid state.

The CPC operating system can set the state of a vector bit to either an valid or invalid setting at any time by means of a CPC instruction (set vector entry SVE) which activate microcode/hardware to perform the bit setting.

SES Structure:

The SES cache is a structure in SES consisting of a collection of data-area elements, a directory, a local cache register, and local cache controls. A SES cache structure is created at the request of programs accessing data shared among CPCs where those programs require coherency and integrity for locally cached copies of data items.

SES Directory:

A SES cache directory is an essential component of a SES device for obtaining SES coherency control. Having a SES data area with a SES cache enhances sysplex performance, but is optional. Without a SES data area, the data records in the sysplex would be accessible only from the sysplex DASD. The data base software operations would lose the performance provided by fast access to shared records in a SES data area. The SES local cache register (associated with SES directory entries) would still identify which CPC local cache buffers (LCBs) in the sysplex have copy(s) of a shared data element.

SES Local Cache Register:

Entries in the local cache register identify the attached local caches which contain copies of the data element identified by the associated directory entry. Each entry in the local cache register provides sufficient information to locate the cache coherency vector associated with the local cache and the local cache entry within the coherency vector used to represent the validity of locally cached copies of the data element.

SES Command Processing:

SES commands, including read and register and write and register cause registration of a locally cached copy of a data element in the SES directory. At the completion of successful registration, the local cache register contains sufficient information to locate locally cached copies of a data element, provide the CPC information regarding the location of the coherency vector associated with the local cache, and provide identification of the bit within the coherency vector being used by the program to represent the validity of the local cache buffer.

SES command processing may cause invalidation of the bit within the coherency vector being used by the program to represent the validity of a locally cached data item. The write when registered, write and register, invalidate complement copies, and invalidate name commands cause cross invalidation processing to be performed.

Cache Coherency Processing Flow Overview:

The data element name is used by SES to control data coherence for the data element regardless of whether the data element is stored in the SES. The data element name must be assigned to the cache directory in SES and each local copy of the data element must be registered in the local cache register (LCR) associated with the directory entry for SES to provide data coherence for the data element in the sysplex. It is not necessary to store the data element itself in SES for SES to provide data coherence, but it is necessary that each local copy of the data be registered by the CPC.

For a CPC to know if the data element is cached in SES or not and to register its local copy, the CPC can use a "read and register" (RAR) command. RAR command checks the SES directory for an existing assignment of the requested record name, and registers the local copy in the associated local cache register. SES reports back to the requesting CPC on whether the data element is cached or not in SES, and when cached, returns the data element.

If a RAR command finds the SES cache does not have the name of the data element assigned, SES may assign a directory entry and register the local copy in the associated local-cache register. SES reports back to the requesting CPC that the data element was not cached. Then the CPC can issue a read command to the sysplex DASD to read its archived copy to the CPC designated LCB.

If a CPC is generating a new data element or knows it has the current copy of the data element, the CPC can use a "write and register" (WAR) command to both register the local copy in the local-cache register and write the data element into the directory entry's data area.

If a CPC is changing (updating) a shared data element in which the CPC has previously registered interest, the CPC uses a "write when registered" (WWR) command. WWR checks in the SES directory for an existing registration of a local copy of the data element for the CPC. Only if the registration is found is the data element written into the entry's corresponding SES cache location. SES sets the directory change bit equal to the CPC specified change indication. An invalidation operation is performed only if the data element is marked as changed.

Each RAR or WAR command received by SES causes SES to register the requesting CPC local cache entry number (LCEN) in a local-cache register associated with the respective SES cache directory entry accessed by the command. The SES LCR records the LCENs of all LCs which accessed the data element in SES. SES uses this LCR data to invalidate any or all copies of a data element in the LCs having the data element. Recording which specific local caches contain a copy of the data element enables SES to avoid sending an invalidation request signal to any local cache not containing a copy of the data element.

Three separate processes invalidate local-cache entries registered in a SES cache directory entry. Local-copy invalidation invalidates all local copies registered in the local-cache register of the SES directory entry. Complement-copy invalidation invalidates all the local copies except for the local cache identified by the LCID request operand on a command that causes complement-copy invalidation to occur. Single-copy invalidation invalidates only the local cache copy of a specified local cache.

SES makes an invalidation request to any attached LC by sending a "cross invalidate command" on the channel to the CPC and specifying the LCT and LCEN values identifying the vector and its bit to be set to invalid state. The transmitted LCT/LCEN values result from information retrieved from the local cache controls (105) and local cache register.

When a data element is stored in the SES cache, and the write requests indicates that the data element is changed from the current copy of the data element registered in SES, SES performs complement-copy invalidation processing.

An "invalidate complement copies" (ICC) command to SES specifically causes SES to perform complement-copy invalidation processing for the named data element. The ICC command is particularly useful when records are not stored in SES, but are only stored in DASD, where the ICC command is used after committing (storing) the changed data element in the DASD.

Another command used to maintain SES usage and coherence is an "invalidate name" (IN) command, which is sent to SES with a data element name by any CPC that wants to purge a data element from the SES. SES looks up the data element name in its directory and finds the location of all local caches currently having a copy of the data element. Then SES performs local-copy invalidation, sending invalidation requests to all CPCs having an LCB containing a copy. When responses are received from all requested CPCs, SES deletes that data element name from its directory and deregisters the local copies from the LCR.

Managing Data Movement From A SES Cache To DASD:

Patent application Ser. No. 07/860,806 describes a method and structure in a shared data, multi-computer system which guarantees that any page of data which is changed in a shared cache (aka SES) and which is being cast out to DASD prior to making the page available for SES storage reclamation will not result in deletion of a later version of the page written to the shared memory (aka SES) while the castout operation is in progress.

The described mechanisms do not require higher level locking or serialization and queuing mechanisms in a shared memory to guarantee consistency between page versions when removing a page from the shared memory for entry into secondary storage (DASD).

In a multi-system, data-sharing complex, a database system executing on a first computer system could be reading a modified page in a shared cached as a first step to write the page to secondary storage while another database system could be trying to cache an even more recently updated version of the same page in the shared cache. The described mechanisms detect such a condition and, without a blocking mechanism such as locking, bars deletion of the updated copy of the page from the cache after the first computer system has stored the prior version in secondary storage.

Patent application Ser. No. 07/860,806 describes a technique for operating a shared cache that does not require any additional serialization mechanisms such as higher-level locking to guarantee that a more recent version of a page is not deleted from the cache while an earlier version is written to secondary storage. The SES cache includes a directory containing a directory entry for each page stored in the cache. A castout lock field is provided in the directory entry for each page in the cache. The castout lock field contains the local cache identification of an attached cache user currently performing a castout operation. This field operates in conjunction with a change field used to indicate whether the page has been changed. If the change field indicates that the page has been changed during an ongoing castout operation, it prevents deletion of the page, thereby preserving the latest version of the page in the shared cache for a following castout operation. A castout process is only allowed to proceed if the castout field is zero, indicating that no castout is in progress, and allows reclaim of the page only if both the castout ID and change bit fields are zero. The mechanisms include a castout command operation, namely a "read for cast out" operation that enters the identification of the requestor into the castout ID field, sets the change indication to zero and returns the data to the requestor.

Castout Processing Flow Overview:

The SES-cache storage is normally smaller than the DASD storage. Thus periodically the changed data must be transferred from the SES cache to the backing DASD. This process, called castout, is controlled by the program and involves the following operations:

A SES-read for castout operation is issued that sets the castout serialization and copies the data block to main storage.

An I/O operation is executed that copies the data block to DASD.

A SES-unlock operation is issued that releases the castout serialization

Related changed data items are maintained in castout classes by the SES cache. Castout classes are used to improve the efficiency of the castout process by enabling the program to batch data transfers to DASD in a single I/O operation. The processes which perform the movement of data between DASD and the SES cache are described in patent application Ser. No. 07/860,806.

Objects within the SES directory which enable efficient castout processing include:

Castout Class (CCL) A value which identifies the castout class assigned for the name. Directory entries of changed data are maintained in least recently changed order in the castout class.

Castout Lock (CO) A value which indicates the castout state of the data. When the castout lock is zero the data is not being castout. When the castout lock is not zero, the value of the first byte of the castout lock identifies the local cache that is casting out the data block from the SES cache to DASD. The value of the second byte identifies the castout process on the local system. When the castout lock is not zero, the data must be stored within the SES cache.

Change Bit (C) A one-bit value which, in conjunction with the castout lock, indicates the changed state of the data. When the change bit is one, the data is cached as changed. When the change bit is zero and the data is not locked for castout, the data is either not cached, or is cached but not changed. When the change bit is zero and the data is locked for castout, the data is cached as changed. Whenever the data is in the changed state, the most recent version of the data resides in the SES cache.

When the change bit is one, the data must be stored within the SES cache.

The castout process may be initiated in one of several ways including:

Event-driven castout: Counts of changed data elements are compared after each write operation. This triggers castout processing for the specified castout class at the time the write command occurs and defined thresholds are exceeded. The comparison is part of the processing of the database manager.

Timer-driven castout: A set of counters is requested at timed intervals. The comparison is part of a background program and is not part of any transaction processing. A balance between responsiveness to castout processing and transaction overhead in processing the counts must be maintained.

Commands at the SES in support of the castout process include:

Read Castout Class: The read-castout-class command returns a list of name blocks to main storage. Directory entries are processed when the name field matches the input name under the mask condition and the directory entry is queued to the specified castout-class queue.

Read Castout-Class Information: The read-castout-class-information command returns statistics for a range of castout classes.

Read Directory: The read-directory command scans the directory and returns a list of directory-entry-information blocks.

Read For Castout: The read-for-castout command returns the contents of a named data area to the local cache, locks the name for castout, and resets the change bit.

Unlock Castout Locks: The unlock-castout-locks command resets the castout lock to zero and stores the user-data field in the directory entry for a list of names.

Write and Register: The write-and-register command stores the contents of the data block in the data area and registers the local-cache entry when the change control is compatible with the change state of the data.

Write When Registered: The write-when-registered command stores the contents of the data block in the data area, provided the name is assigned in the directory, the local-cache entry is registered, and the change control is compatible with the change state of the data.

During mainline operation, the data base manager is responsible for managing the storage of the SES cache. The data base manager is also responsible for managing the migration of changed data elements from the SES cache to DASD. The time out interval established during initialization causes the operating system to give control to processing routines on a periodic basis for management of SES cache storage and migration of SES cache data to DASD. The facilities described above provide the base on which management of data movement between DASD and a SES cache is performed by system software. Techniques which use these primitive services to implement a non-blocking serialization protocol between normal read/write activity and castout of data from SES are utilized. Additionally, primitive services described provide the base for determining the set of modified data elements to be moved from a SES to DASD in a manner which optimizes the overall performance of the coupled systems environment.

An example of one protocol for managing the movement of data from the SES cache to DASD is as follows. The read castout class information command is issued for each cast out class and candidate castout classes are selected. The read castout class command is issued for each selected castout class. A list of least recently updated directory entries is returned. The read for castout command is issued for each selected directory entry. I/O requests are built to cause the data read from SES to be written to DASD. When the I/O operations have completed, the unlock castout locks command is issued.

SUMMARY OF THE INVENTION

This invention introduces novel changes in the SES cache functions from those described in the referenced patent applications, providing cache coherency and storage management constructs required for exploitation of the SES cache as a "store-multiple" cache.

As used herein, the term "store-multiple" cache is meant to convey a caching model wherein updates to data are made by writing the modified data to the SES cache and writing the modified data to the backing DASD as well. Both updates must be successfully stored before considering the write operation completed. The store-multiple cache model has value for exploitations that rely on the DASD copy to contain all database updates to protect against the loss of critical data in the event of a SES cache failure.

Since the data is being written to both SES and to DASD, the version maintained in the SES store-multiple cache will be consistent with the DASD version when the write operation is considered complete. So it is desirable to write the data to SES in an "unchanged" state, allowing SES storage reclamation processes to proceed against the data item at completion of the write operation, in accordance with the mechanisms described in patent application Ser. No. 07/860,807.

The SES cache definition as described in the referenced patent applications provides non-blocking serialization for SES read and SES write operations. These are desired attributes of a store-in cache. For a store-multiple cache, there is a requirement to block a record update write to a SES cache entry while a concurrent update of another record in the same entry is in the process of being written to DASD. Otherwise, the most current update could be committed to DASD before the I/O operation committing an earlier update to DASD is completed, erasing the most current copy of the data.

For a store-multiple cache, there is also a requirement to block the read of a SES cache entry while that entry's data is being written to DASD. In the event of an error which precludes the data from being written to DASD, there is a requirement that the SES entry be deleted. Otherwise a reader may read and process data which due to an error the writer was not able to write to DASD. Failure to block a concurrent read request can lead to a data integrity problem in that the reader may proceed to make an incorrect decision or change based on the copy of the data that it read, which is inconsistent with the last-committed copy of the data on DASD.

The SES cache mechanisms described in the referenced patent applications do not satisfy these data integrity requirements when applied to a store-multiple cache. It is a primary object of this invention to provide an entry-level serialization mechanism on write operations to a SES cache entry for the purpose of ensuring data integrity across a store-multiple write operation to SES and DASD.

By combining the entry-level coherency mechanism provided by the execution of the Write When Registered command with the atomic setting of castout lock entry-level serialization, which can persist across a write of modified data to DASD, a SES cache may be used as a store-multiple cache supported by program-provided record-level locking protocols, with guaranteed data integrity.

A performance advantage is also derived in that the option to atomically set the castout lock with the write to the SES cache entry avoids the extra overhead associated with existing mechanisms, wherein it is necessary to first write the entry in a changed state and subsequently issue a Read For Castout command to set the castout lock. For a store-multiple cache, the user already has a copy of the data and is prepared to write that data to DASD. The extra read from SES performed by the read-for-castout command is unnecessary overhead for a store-multiple cache write operation.

It is a primary object of the invention to provide a mechanism wherein data can be written to the SES cache in an unchanged state, performing cross-invalidation functions as part of the SES write command processing.

This feature provides a performance advantage over existing mechanisms, in that the cross-invalidation function critical to local cache coherency is performed as part of the store-multiple SES write operation, eliminating the need to execute a separate invalidation command to achieve this function.

It is a primary object of this invention to provide store-in cache and store-multiple cache semantics concurrently for different entries in a SES cache.

A more specific object of the invention is to provide a method to control the execution of SES commands directed to a cache entry while the castout lock is set to a non-zero value, based on the value of a new Castout Lock State indication in the directory entry controls. The castout lock state is set to a "read for castout" state when setting the castout lock for the entry during execution of a Read For Castout command, and is set to a "write with castout" state when setting the castout lock for the entry during execution of a Write And Register or Write When Register command.

SES cache store-in protocols currently supported in the previous dockets continue to be provided, i.e. allowing a non-blocking read/write coherency mechanism concurrent with castout of changed data to DASD. Support for SES cache store-multiple protocols is added to provide for blocking concurrent read or write activity to an entry, the data for which is in the process of being written to DASD. Recovery cleanup for entries locked for castout when the program holding the castout lock fails is also defined to support store-multiple cache protocols, ensuring data integrity is preserved.

The scope of control is at the entry-level granularity, not a cache structure attribute. Therefore, it is possible to support both store-multiple and store-in cache protocols concurrently for different entries in the same cache. This facilitates supporting a mixture of entries which are store-in only, such as index pages which are written changed to the SES cache so they are never reclaimed, as well as data pages for which changes are written to the SES in an unchanged state and also written to DASD before considering an update committed.

This granularity provides for dynamic transitioning between store-in and store-multiple caching program protocols. Such a transition might be triggered in high-availability configurations wherein store-in caching protocols are used as long as data changes are committed to two independent SES structures, preferably in two separate SES facilities. However, if one of the two structures fails, the program may switch to store-multiple protocols for data written to the remaining structure, not considering data changes committed until also written to DASD. During the transition period, entries may exist in the cache structure, some of which are marked as changed and some of which are in the process of being committed to DASD as evidenced by the castout lock being set with a "write with castout" state indicated.

It is a primary objective of the invention to provide referential integrity for data stored in a store-multiple SES cache. A mechanism is provided wherein the castout lock value and the castout lock state (COLS) are returned upon completion of SES read commands.

For store-multiple cache protocols, the reader should generally not use data retrieved from a SES cache entry if a concurrent update of a different record has been written to the SES cache entry and the castout lock set, but the update has not been committed to DASD yet. This is particularly true for non-recoverable data, such as non-recoverable VSAM files, wherein if the writer performing the update fails before completing the write to DASD, it is possible that the record lock on the record being updated will be released before backout of the uncommitted change in the SES takes place. If a concurrent read of a different record in the same page were allowed to proceed prior to backout of the failed write operation (returning the entire page contents including the uncommitted update of the record in error), that invalid update would now be visible and subject to retrieval or manipulation as soon as the record lock for the record in error was released.

In order to know whether it is safe to proceed with a read operation, it is necessary to be cognizant of the castout lock value and the castout lock state value. When the castout lock is held and the castout lock state value (COLS) indicates "write with castout" state, the reader defers the read operation until a read command is issued and finds the castout lock not held, held in a read for castout state, or a read-miss occurs on the cache entry and the data is fetched from DASD. If the COLS indicates "read for castout" then the reader proceeds with the non-blocking read process in accordance with store-in cache commit protocols, (i.e. wherein the data associated with the SES directory entry is considered to be the most current committed version of the data).

It is a primary objective of the invention to provide recovery mechanisms for a SES cache which ensure referential integrity is maintained across cleanup for a failure of an incomplete store-multiple write operation. These mechanisms are provided without necessitating that store-multiple caching programs acquire global serialization in order to effect cleanup for such failed write operations.

It is a more specific objective of this invention to provide a mechanism wherein the processing associated with the execution of a Detach Local Cache command is dependent on the Castout Lock State for entries which are locked for castout with a castout lock LCID value that matches the LCID of the user being detached from the SES cache. If the COLS is in the "read for castout" state, the detach processing for the directory entry proceeds by clearing the row in the local-cache register associated with the LCID being detached, resets the castout lock and castout lock state to zero, and sets the directory entry change bit indication to the changed state. If the COLS is in the "write with castout" state, the detach processing for the directory entry proceeds by clearing the row in the local-cache register associated with the LCID being detached, performs complement-copy invalidation for all other users having valid registered interest in the entry, and invalidates the directory entry itself.

If the writer terminates while holding castout lock serialization on an entry then cleanup of the entry must be performed, including release of the castout lock.

If the castout lock cleanup were left to be the responsibility of other data-sharing users still attached to the SES cache, some global serialization mechanism would have to be implemented to ensure that one and only one user was responsible for that cleanup. If multiple users were allowed to release the castout lock (via the Invalidate Name command described in the referenced patent applications), then a legitimate writer could obtain the castout lock after release by a first user responsible for cleanup and then a second user responsible for cleanup could inadvertently release the castout lock a second time, this time stealing the lock from the legitimate writer. A data integrity exposure would ensue.

If the detach local cache command was to process the release of the castout lock when held in a "write with castout" state in a manner consistent with the handling of a castout lock held in a "read for castout" state (by over-indicating the change bit in the directory entry) a data integrity exposure would ensue. A store-multiple protocol reader, blocking a read operation against the entry while locked for castout, would have no reason to continue to block a read against an entry once the castout lock was released, even though the data contents of the entry would represent an update not committed to DASD.

This invention ensures that an uncommitted update to data associated with an entry locked for castout by a user being detached is discarded from the SES cache and all local copies of the page are invalidated requiring refetch of the current data from DASD.

It is an objective of this invention to block a store-in cache write from executing concurrently to a SES cache entry which is currently the object of a store-multiple cache write. This is required to provide data integrity of a SES cache supporting store-in and store-multiple caching protocols within the same cache structure. More specifically, it is an objective of this invention to provide a mechanism wherein a Write And Register or Write When Registered command specifying the data associated with command is to be written in a changed state, is rejected if the entry is currently locked for castout with a castout lock state set to "write with castout".

If a store-in cache protocol write operation is allowed to store through the castout lock value when locked in a "write with castout" state and the store-in update is considered committed when stored in the SES cache, the potential exists that the update will be lost if the writer holding the castout lock fails. The update could be lost when a resultant Detach Local Cache process finds the entry locked for castout by the failing store-multiple writer and invalidates the directory entry in the SES, losing the committed update by the store-in protocol write operation.

BRIEF DESCRIPTION OF THE DRAWINGS

The invention may best be understood with reference to the accompanying drawings in which:

FIG. 4 represents a preferred form of an entry in a SES local cache register (LCR).

FIG. 5 provides a flow diagram that represents an attach local cache command.

FIG. 8 shows the format of the directory-entry information block (DEIB).

DETAILED DESCRIPTION OF THE PREFERRED EMBODIMENT

Overview:

The invention provides the structure of a multi-system data sharing complex including a shared cache in the form of a non-volatile electronic memory (aka SES). This invention more specifically provides the methods for operating the SES cache as a shared store-multiple cache. The constructs for store-multiple caching are provided to apply at a granular level to an individual data item, which allows entries to co-exist in the shared SES cache in either a store-multiple or store-in mode. The referenced patent applications assigned to this same assignee, specifically detail the mechanisms for managing the SES cache as a store-in cache.

This invention combines mechanisms for entry-level cache coherency control and castout processing serialization to facilitate store-multiple write operations to a SES cache and to DASD with complete data integrity, without requiring the data-sharing programs to obtain external global entry-level serialization to block concurrent read/write access to data. This data is only partially committed until it is stored at SES and on DASD as well.

The invention provides necessary recovery mechanisms to facilitate integrity of SES cache cleanup processes without requiring global locking to be provided by the programs at a page level or higher.

In addition the methods and means of the invention provide constructs for performing necessary cross-invalidation cache coherency functions when writing data to the SES cache in an unchanged state, an attribute required for efficient store-multiple caching.

Further, the invention provides the ability for the SES cache to function both as a store-in and a store-multiple cache as required by data-sharing programs exploiting the SES cache. Adherence to the behavioral requirements for serving as a store-in or store-multiple cache is granular to the entry-level in a SES cache.

Following is the detailed description of the preferred embodiment for practicing the invention.

Figure 1:
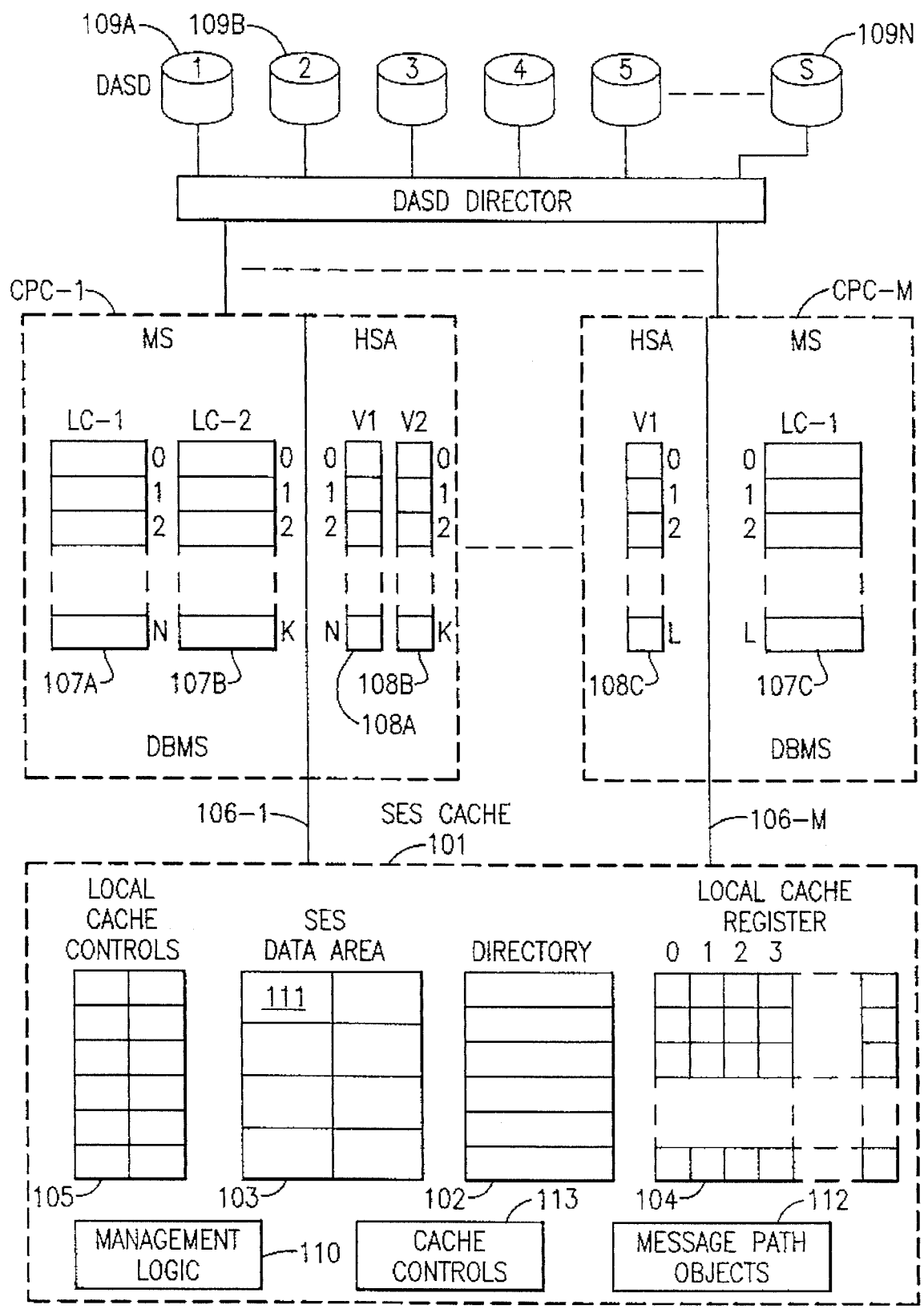
FIG. 1 represents a sysplex system with a plurality of CPCs and a SES device.
Figure 2:
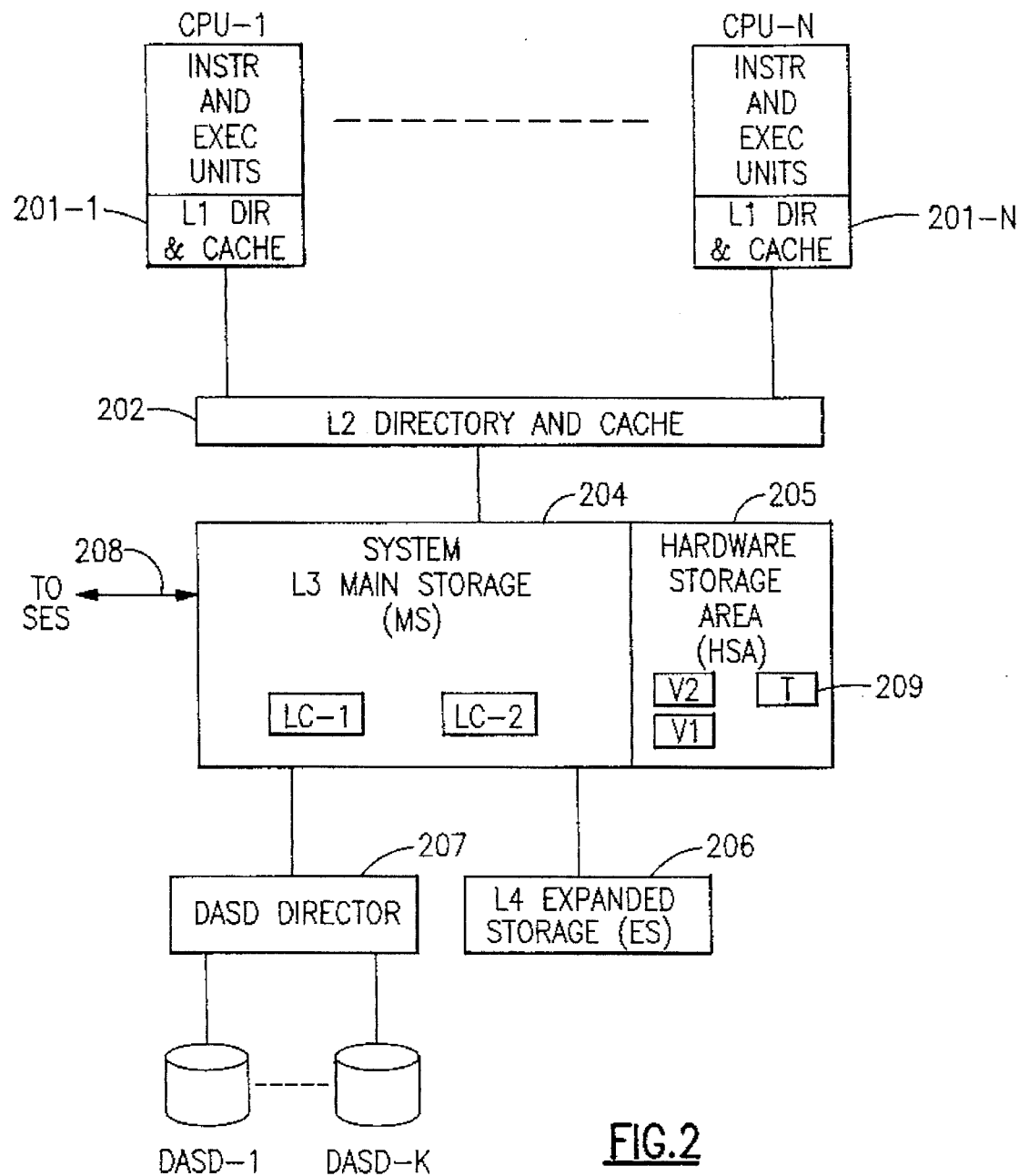
FIG. 2 represents a single CPC (computer processor complex) as may be found in the prior art.

The preferred embodiment comprises a plurality of CPCs containing operating systems supporting attachment to shared DASD and a shared electronic storage (SES) facility. Data is to be shared and managed on DASD and in a cache contained in the SES, and in local processor storage in the CPCs following a system architecture which ensures data integrity and high performance. Such an architecture is illustrated in FIG. 1 and includes a plurality of independently-operating computer systems CPC-1 through CPC-M, which share data stored on direct access storage devices (DASD) 109A, 109B, through 109N. The DASD's 109A, 109B, through 190N can comprise, for example, multi-disk disk drives. The architecture includes M computer systems, CPC-1 through CPC-M, each including a database management system (DBMS) which controls creation, organization, and modification of a database comprehending data on the DASD's and which controls access to the data in the database. Also provided in the system is a high-speed non-volatile electronic memory (SES at 101) which functions as a cache shared by the computer systems. The memory (101) is attached with high-speed links 106-1 through 106-M to the computer systems CPC-1 through CPC-M. Hereinafter, the memory 101 is referred to as either "the memory" or "NV-store", or "SES".

When comparing access to the memory 101 with access to DASD's 109A through 109N, it is asserted that the memory 101 is a relatively high-speed semi-conductor memory. Further, the attachment of the memory 101 to the computer systems is by way of, for example, fiber optics communication channels which provide very high speed data transfer. Relatively speaking, an I/O operation conducted with the high-speed memory 101 will complete significantly sooner than I/O with relatively lower-speed DASD which can take tens of milliseconds.

The memory 101 includes management logic 110, preferably in the form of a processor which manages all memory storage operations. The management logic 110 can comprise, for example, a high performance processor with a local program store and memory, rendering a management logic device capable of engaging in message-based memory access transactions with the computer systems CPC-1 through CPC-M.

Respecting the computer systems CPC-1 through CPC-M, these entities can comprise, for example, IBM/3090 Systems, each including a multi-processor architecture with a private cache, and each capable of supporting a database management system of the IMS/VS or DB2 type.

Substantially, the invention is practiced in the data sharing complex illustrated in FIG. 1 and described above. In the memory 101, are found a semi-conductor memory designated as a shared cache 103. The shared cache 103 can comprise conventional, multi-port, high-speed, random access memory which is preferably non-volatile. The shared cache 103 is used for storage of blocks of data. For example, the shared cache 103 can be used to store areas of data, where one such area is indicated by 111.

The management logic 110 has memory resources for storage and maintenance of local cache controls 105 and a directory 102. The local cache controls (105) and directory (102) are accessed conventionally by the management logic 110. For example, well-known hashing lookup mechanisms can be used for accessing these data structures. The local cache controls 105 is a data structure containing a plurality of entries, each entry identifying a computer system which has connected operationally to the memory 101. Assuming, for example, that the computer systems CPC-1, . . . CPC-M have connected, they will be listed in the local cache controls 105.

The shared cache 103 is operated as a "directory-only" cache, as a "store-in" cache, or as a "store-multiple" cache. In this regard, a directory-only cache is one in which the SES cache is used to provide data coherency mechanisms only, such that data updates are applied only to the secondary storage medium (DASD). A "store-in" cache is one into which updated data elements (e.g. areas) can be written without the requirement that those data elements be written simultaneously into secondary storage (DASD). A "store-multiple" cache is one where updates to data elements are written to the shared SES cache and applied to the secondary storage as well before the update can be considered completed. This invention provided the methods and means to enable the SES cache to support store-multiple caching protocols with data coherency and integrity.

A SES cache is a component of a three-level storage hierarchy in a network of attached processors. The lowest level of the hierarchy is DASD, the intermediate level is the SES-cache and the highest level is the local cache in processor storage. The DASD and SES cache are shared by the processors and are accessed by I/O operations and message operations, respectively. Local cache(s) may be defined in each processor and is accessed using CPU instructions.

Data that moves through the storage hierarchy is named. The data sizes are variable with the range of variability between 1 and N times the data-area element size. The data-area element sizes are fixed for each SES cache and are powers of 2 with a minimum size of 256 bytes. The names are 16-byte values assigned by a programming protocol. The data is permanently resident in the DASD storage.

Copies or new versions of the data may also reside in any combination of SES-cache storage or local-cache storage. In particular, a data object may reside in SES-cache storage, but not in any local cache, it may reside in SES-cache storage and a subset of local caches or it may reside in a subset of local caches but not in the SES-cache storage.

Figure 3:
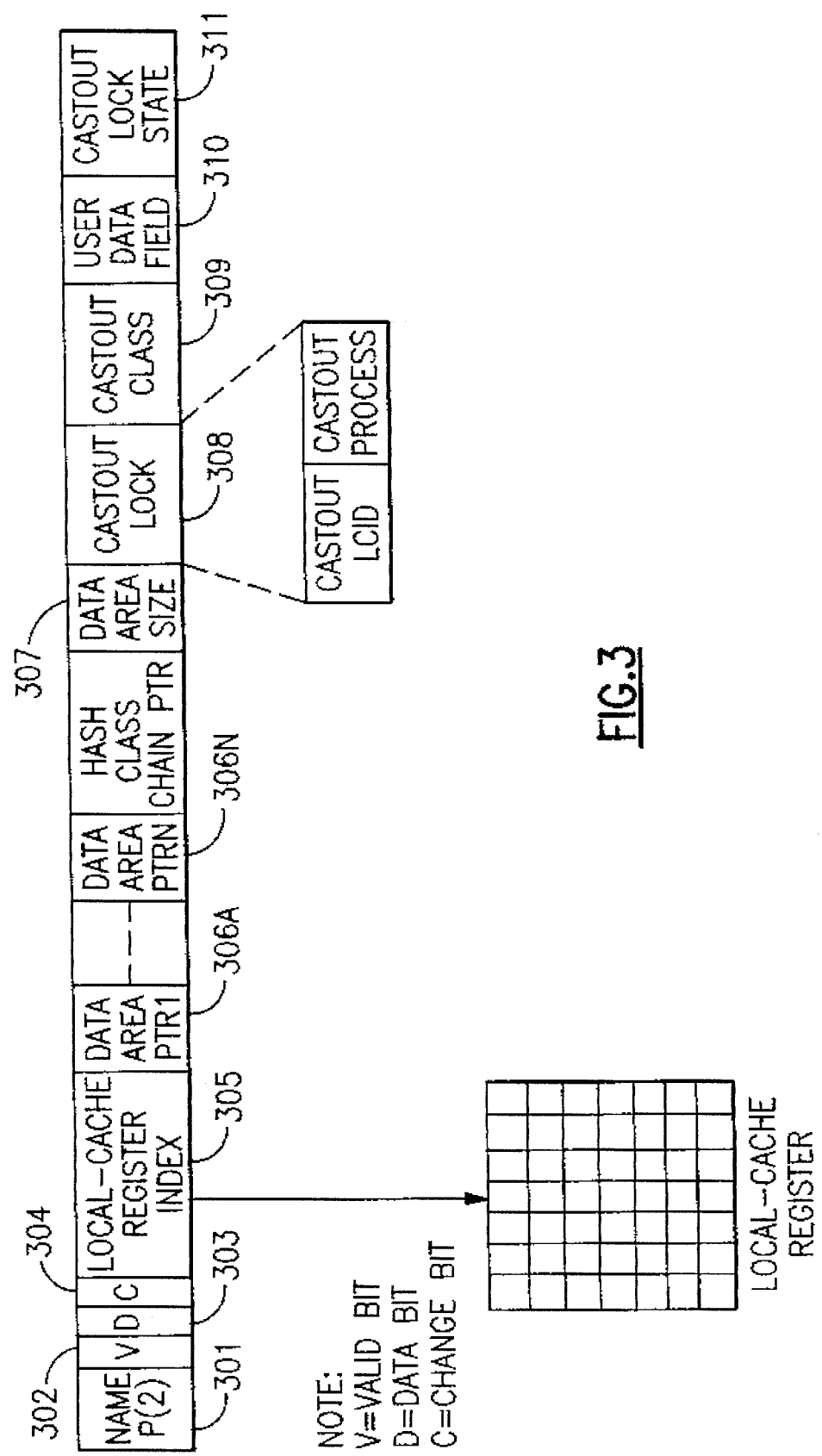
FIG. 3 represents a preferred form of an entry in the SES directory.

As an example, assume data elements being referenced in the storage hierarchy are pages (4096 byte storage areas). Then, a page cached in the shared cache 111 is identified by a software-assigned name. Therefore, any requests for reading or writing in the shared cache 111 are required to specify the name of the page which is the object of a request. The directory 102 is conventionally indexed by the names of pages which are objects of READ or WRITE commands. A representative entry in the directory 102 is shown in FIG. 3. In respect of the invention being described, the fields of the directory which are relevant are shown in FIG. 3. These include a name field 301, a data bit (D) field 303, a data area pointer field 306A through 306N, a change bit (C) field 304, a valid bit (V) field 302, a data area size field 307, and a local cache register index providing access to a local cache register shown in FIG. 4. The local cache register contains identification of a local cache attached to the SES cache (402A through 402C), the local cache entry number associated with an attached local cache (403A through 403C) and valid bits (401A through 401C).

Continuing the example, the page name field 301 is the field by which the management logic 110 indexes into the directory 102. Assume that the management logic 110 receives a READ or WRITE command, either of which would be accompanied by a value for a parameter P identifying the page. Management logic 110 subjects the value for P to a hashing process which generates a value used by the logic to access the directory quickly via the page name, if it already exists. Once the page name field has been located, the page address field 306 is used to point to the address in the shared cache of the identified page.

The management logic 110 creates, manages, and deletes directory entries as necessary. The management logic 110 is also conventionally structured to obtain data from, and enter data into, the SES data area 103, although according to read and write operations which are unique to this invention. The management logic 110 also includes the usual cache management capability to generate "cache miss" and "cache hit" responses. These responses are generated in response to commands submitted by the computer systems connected to the shared cache 101. A "cache miss" indicates that an identified data element (eg. page) does not reside in the shared cache 101, while a "cache hit" indicates that an identified data element (eg. page) is in the cache 101.

Commands are generated by the computer systems in the multi-system complex of FIG. 1. These commands elicit responses from the management logic 110. The inventors contemplate that commands and responses are exchanged between a computer system and the management logic by a message protocol. Further, the inventors contemplate that access to the shared cache 101 may be synchronous in that any computer issuing a command may maintain a delay until a response is received from the management logic 110. The speed of the semi-conductor memory forming the shared cache 101 reduces the delay inherent in a synchronous message passing structure.

The inventors also contemplate that the computer systems of the multi-system data sharing complex in FIG. 1 obtain access to DASD's using conventional means, for example, the shared disk capability of an IBM IMS-like system. As is known, such access is asynchronous in that a computer system will not delay while a READ or WRITE command is dispatched to a DASD.

As FIG. 1 illustrates, each computer system includes an identified buffer which is used to stage data exchanged between the computer system and the NV-store 101. For example, the computer system CPC-1 includes a buffer 107A, while buffer 107C is provided in the computer system CPC-M. It is asserted that all computer systems of the data sharing complex possess such private buffers. Further, whenever one of the computer systems provides a READ or WRITE command to the management logic 110, it sends an address in its private buffer where the requested data is to be entered or obtained.

The invention concerns the movement of data into the shared cache from DASD, and the updating of data so moved in both the SES cache and the permanent data home on DASD. Relatedly, a data element (eg. page) which is obtained by a computer system from a DASD for entry into the shared cache is referred to hereinbelow as a "down-level" page when the directory entry for the page has the change bit set to 1, or the castout lock is set to a non-zero value for the entry. When the change bit and the castout lock value in the directory entry for a page are set to 0, the page is referred to as a "clean page". In this regard, the DASD version of the page is the same as a version of the page in the shared cache 101.

The invention depends upon a set of unique commands and the registration in affected directory entries of changes resulting from execution of those commands.

Local Cache:

A local cache is defined to the SES-support facility which enables the management of vectors 108A through 108C and locating mechanism 209. The SES-support facility on the CPC containing the local cache is described in US patent application Ser. No. 07/860,797. CPU instructions initialize controls in the SES-support facility and assign a local-cache token and associated vectors such as 108A through 108C. The sizes of the local caches may vary between systems.

SES Cache:

The SES cache is a structure in SES consisting of a collection of data-area elements 103 and a directory 102. It is designated by a structure identifier. The SES cache is created by an allocate-cache-structure command. The command is issued by an initialization procedure at a processor which determines the attributes of the SES cache: size and number of data-area elements, number of directory entries, and number of castout classes.

A local cache is attached to the SES cache by the attach-local-cache command that initializes controls in the SES facility and builds a set of paths 106 over which the SES cache issues generated commands to the SES-support facility. A local cache is attached to a SES cache so that it may participate in the storage hierarchy. Coherency of copies of the data in the local caches and in the SES cache is maintained by controls in the SES cache and enforced by cross-invalidate commands issued as generated commands to the various SES-support facilities.

SES-Cache Directory:

The SES-cache directory 102 is a collection of directory entries arranged as a fully associative array. The subset of changed directory entries is partitioned into castout classes. Whenever a named data object is placed in the higher two levels of the hierarchy, its state and location is registered by the SES-cache directory. State information indicates whether the data is changed, unchanged, or locked for castout. Location information includes whether the data is resident in the SES-cache storage and which local caches contain a copy. The record (located in the SES cache data area by pointer in locations 306A–306N) is herein referred to by any of several different terms: record, data element, data item, block, page, etc. Certain SES-read and SES-write commands register the local-cache copy in the SES-cache directory. SES-write and SES-invalidate commands remove the registration of local copies.

Local-Cache-Entry Valid State:

When the data is located in the local cache 107A to 107C, the state of the data is either valid or invalid. The valid state of local cache entries is maintained by controls in the SES-support facility. The data is validated by CPU instructions and is invalidated by the invalidation process associated with SES-write and SES-invalidate operations. The valid state of the data is tested by a CPU instruction. A valid named data object must be registered in the SES-cache directory. Local-cache coherency is maintained by the invalidation process.

Castout Process:

The SES-cache storage is normally smaller than the DASD storage. Thus periodically any changed data associated with a store-in SES cache must be transferred from the SES cache to the backing DASD. This process, called castout, is controlled by the program and involves the following operations:

A SES-read for castout operation is issued that sets the castout serialization and copies the data block to main storage.

An I/O operation is executed that copies the data block to DASD.

A SES-unlock operation is issued that releases the castout serialization.

Related data objects are maintained in castout classes by the SES cache. Castout classes are used to improve the efficiency of the castout process by enabling the program to batch data transfers to DASD in a single I/O operation. The processes which perform the movement of data between DASD and the SES cache are described in U.S. patent application Ser. No. 07/860,806.

SES-Support Facility:

The component of the SES configuration responsible for execution of SES functions in the central-processing complex (CPC) is known as the SES-support facility. It includes the following items:

CPU Instructions:

Define Vector (DV)

Set Vector Entry (SVE)

Test Vector Entry (TVE)

Commands:

Cross-invalidate

Data Objects:

Local-Cache Vector

Message Path State

The preceding items are a required part of the SES configuration. Cross-invalidate command execution is performed by the SES-support facility. The SES configuration consists of a SES facility and a SES-support facility resident on each CPC attached to the SES facility.

Storage Model:

Data objects defined for the SES-support facility are not placed in addressable storage and may be manipulated only by the CPU instructions and commands of the SES-support facility. References to these data objects follow the same rules that apply to references to addressable main storage as described in IBM publication SA22-7201.

Vector Tokens:

A vector token is a 64 bit value used to uniquely identify a particular local-cache vector. A token is provided when a vector is defined and persists until the vector is released.

Local-Cache Vector:

The local-cache vector (a.k.a. coherence vector) is created by the DEFINE VECTOR instruction. The sizes of the local-cache vectors may vary among different cache users. The local-cache vector is attached to the SES cache structure through use of the attach-local-cache command. Each entry in a local-cache vector indicates the valid or invalid state of a locally cached data element. A locally cached copy is said to be invalid when it is no longer current with respect to the shared copy registered at the SES facility. The TEST VECTOR ENTRY instruction is provided to interrogate the state of a locally cached data copy represented in the local-cache vector.

A local-cache vector entry is 1 when the associated locally cached data item is current with respect to the shared copy registered at the SES facility. A local-cache vector entry is 0 when the associated locally cached data item is not current with respect to the shared copy registered at the SES facility.

Message-Path States:

The SES-support facility communicates with the SES facility by means of message paths 106, each comprised of an intersystem link and an intersystem channel used to transmit and receive messages over the link. The state of a message path, as registered at the SES facility and designated by a message-path identifier, is either active or inactive.

The high performance cache cross-interrogate function provided through the use of a local-cache vector is achieved by means of the SES-cache cross-invalidation process and the appropriate manipulation of the local-cache vector by programming before and after the execution of specific SES cache commands.

Many SES cache commands provide programming the ability to register interest in a named SES-cache data entry so that a local copy of the data may be kept in processor storage. Keeping a local copy of the data improves performance by reducing the number of accesses to the SES facility. The locally cached copy is said to be valid until it is no longer current with respect to the shared copy registered in SES. The locally cached copy is made invalid by means of a cross-invalidate command.

Local-cache registration is required to enable the cross-invalidation process. Local-cache registration is performed at the SES facility and consists of recording the local-cache identifier, local-cache token, and local-cache entry number associated with the locally cached copy of the data. Programming is responsible for indicating the validity of the locally cached data element in the local-cache vector at the time interest in the locally cached copy is registered at the SES facility. The SET VECTOR ENTRY (SVE) instruction is used for this purpose.

Programming will use the SVE instruction to optimistically set the local-cache vector entry to one before initiation of a SES cache command which designates the entry for purposes of local-cache registration. If command failure is either indicated or presumed, the SVE instruction should be used to zero the local-cache vector entry.

SES-Support Facility Commands:

Cross-Invalidate:

The reception of a cross-invalidate command by the SES-support facility results in a cross-invalidate operation. The cross-invalidate command contains a local-cache token (LCT) and a local-cache-entry number (LCEN). The cross-invalidate operation includes invalidating the local-cache entry selected by the local-cache-entry number in the local-cache designated by the local-cache token by setting the selected local-cache bit vector entry to zero and indicating by a response to the SES facility that the cross-invalidate operation occurred.

The selected local-cache entry is invalidated by setting the selected local-cache bit vector entry to zero unless the local-cache-entry number is greater than or equal to the number of local-cache entries associated with this local-cache or unless the designated local-cache token is not in the assigned state. These conditions can occur if the size of the local-cache is modified or a local-cache token is released while a SES-cache-directory entry indicates validity for this local-cache entry.

When the cross-invalidate operation completes, the invalid state of the local-cache entry selected by the cross-invalidate operation is visible to any CPU in the configuration.

Message-Path Object:

In general, several processors issue SES commands, and several links connect each processor to the SES facility. The SES facility assigns message-path identifiers that distinguish among the different sources of commands.

The message-path objects 112 are summarized in the following:

Message-path identifier (MI)

Message-path state (MPS)

Message-path status vector

Path group

System identifier (SI)

Message-Path Identifier (MI):

Values that are used to identify message paths at the SES facility. There is a unique message-path identifier for each source of commands.

Message-Path State (MPS):

A value that specifies the state of the message path. The value specified indicates the path is either in an inactive state, or the path is in the active state.

Message-Path Status Vector:

The message-path-status-vector object contains state information for each message path in the SES facility. The message-path status vector includes objects for each message path:

The message-path state (MPS)

The system identifier (SI)

Path Group:

The set of message paths with the same system-identifier (SI) value is the path group for the system.

System Identifier (SI):

A value that is designated by the program when the message path is activated. The control program specifies the same system-identifier value for all paths that are activated between the system and the SES facility.

Cache Structure:

A set of cache-structure objects is established for each SES-cache structure. The cache-structure objects consist of:

Cache controls

Local-cache controls

Directory

Local cache register

Data areas

Cache Controls (113):

Data-Area-Element Characteristic (DAEX):

A value that specifies the number of bytes in each data-area element. The size of the data-area element in bytes is the product of 256 and 2 raised to the power of the value specified in the data-area-element characteristic. Valid sizes in bytes are 256 to the maximum data-area-element size.

LCID Vector (LCIDV):

A bit string with an initial value of zero. The bit positions start at 0 and increase sequentially. The bit at position (i) in the string is set to one when a local cache is attached with an LCID value of (i). When the bit is one, the local-cache identifier is assigned. The bit at position (i) is reset to zero when the local cache is detached and LCID unassignment is requested or when the cache structure is deallocated. When the bit is zero, the local-cache identifier is not assigned.

Maximum Data-Area Size (MDAS):

A binary integer that specifies the maximum allowable size of a data area as an integral multiple of the data-area-element size. The maximum data-area size is set by the program when the cache is allocated.

Structure Size (SS):

An unsigned binary integer that specifies the number of 4K-byte units of SES storage allocated for the cache.

Total-Data-Area-Element Count (TDAEC):

An unsigned binary integer that specifies the number of data-area elements allocated for the cache.

Total-Directory-Entry Count (TDEC):

An unsigned binary integer that specifies the number of directory entries allocated for the cache.

Local-Cache Controls:

The local-cache controls are initialized when a local cache is attached to the SES cache and are deleted when the local-cache identifier is unassigned. The local-cache controls are valid when the local-cache identifier is assigned.

The local-cache controls are summarized in the following:

Attachment information (AI)

Detachment restart token (DRT)

Local Cache Authority (LCAU)

Local-cache token (LCT)

System identifier (SI)

Attachment Information (AI):

A value set by the program when the local cache is attached.

Detachment Restart Token (DRT):

A value used to control the detachment process. The initial value is zero.

Local Cache Authority (LCAU):

An authority value set by the program when the local cache is attached.

Local-Cache Token (LCT):

A value used to identify the local cache on the CPC. The local-cache token is provided on cross-invalidate commands and is checked by the SES support facility.

System Identifier (SI):

A value specified by the program when a message path is activated. The system identifier is maintained in the message-path status vector, and copied into the local cache controls when an attach-local-cache command is communicated over the message path.

Directory:

The directory is the repository of state and location information for the SES and attached local cache(s). Each named data block that appears in the SES cache storage has an associated directory entry. The directory entries are arranged as a fully associative array and are accessed by using the value of the name field.

The directory-entry fields (FIG. 3) are summarized as follows:

Castout lock

Castout lock state

Castout class

Change bit

Data bit

Data area size

Data area pointer

Local-cache register & index

Name

Valid bit

User data field

Castout Lock (CO) (308):

A value which indicates the castout state of the data. When the castout lock is zero the data is not being castout to DASD. When the castout lock is not zero, the value of the first byte of the castout lock identifies the local cache that is either casting out the data block or completing a store-multiple write of the data block to DASD. The value of the second byte identifies the castout process on the local system. The changed state of the data is determined by the setting of the change bit in combination with the castout lock value. Whenever the castout lock is held, the data is considered as cached in the changed state, regardless of the setting of the change bit. When the castout lock is not zero, the data bit must be one.

Castout Lock State (COLS) (311):

A 2-bit value which defines the state of the castout lock. It has the following meanings:

00—Reset

01—Read For Castout

10—Write With Castout

11—not defined

The reset state is entered when the name is assigned to the directory entry, or when the castout lock is reset to zeros. The read-for-castout state is entered when the castout lock is set by the read-for-castout command. The write-with-castout state is entered when either the write-and-register or write-when-registered command is executed and the castout-lock control bit is set.

Castout Class (CCL) (309):

A value which identifies the castout class assigned for the name. The castout class is only meaningful for a store-in cache.

Change Bit (C) (304):

A one-bit value which, in conjunction with the castout lock, indicates the changed state of the data. When the change bit is one, the data is cached as changed. When the change bit is zero and the castout lock is not held, the data is either not cached, or is cached but not changed. When the change bit is zero but the castout lock is held, the data is cached as changed. Whenever the data is in the changed state, the most recent version of the data resides in the cache. When the change bit is one, the data bit must also be one.

Data Bit (D) (303):

A one-bit value which indicates whether the data is located in the SES cache. When the data bit is one, the data is cached. When the data bit is zero, the data is not cached.

Data-Area Size (DAS) (307):

A value that specifies the size of the data area as an integral multiple of the data-area-element size. The initial value is zero when the directory entry is assigned and is zero until the data bit is set to one.

Data-Area Storage (306):

Each directory entry also has N number of data area element pointers 1 through n, which respectively contain a pointer to different block areas in the cache data area (306A thru 306N). Each of these pointers may address a data-area-element anywhere in the SES memory. Thus a record referenced by a directory entry may be contained in up to N number of data-area-elements that may be scattered anywhere in the SES memory.

Local-Cache Register (LCR) (FIG. 4):

The local-cache register is a table containing information on the location of the locally cached copies of the data block. Each row in the table corresponds to a local cache identifier. The columns contain the local-cache identifier (402A, 402B, 402C), the local-cache-entry number (403A, 403B, 403C), and a valid bit (401A, 401B, 401C) for the local-cache-entry number.

A valid local-cache-entry number is registered in the local-cache register when a registration process is executed for the specified name and local cache. A local-cache-entry number is invalidated when a local cache is detached, or when an local-copy-invalidation process or a complement-copy-invalidation process is executed for the specified name and the local cache is a member of the set of local caches being invalidated.

Name (N) (301):

The name contains a value specified by the program when the named data object is registered in the cache.

Valid Bit (V) (302):

A one-bit field which indicates the valid state of the directory entry. The two possible values are: 0 invalid; 1 valid. The directory entry is initialized to the invalid state. When in the invalid state the directory entry is available for assignment to a name. The valid state indicates that the name is assigned and the remaining fields in the directory entry are valid.

User Data Field (UDF) (310):

A program-provided data field.

Data Area:

The data area is a storage object containing the contents of a single named data object. A data area is associated with a directory entry when the named data object is initially written into the cache and remains associated until either a reclaim operation occurs or the name is invalidated. The data area consists of from one to 16 data-area elements. The data area size is determined when the named data object is written.

Cache Structure States:

The cache structure maintains the following state information for each local cache:

Local-cache states

Local-cache identifier states

Local-Cache States:

A cache-structure local cache exists when the associated local-cache identifier is assigned. A local cache is placed in the attached state by the attach-local-cache command. A local cache is placed in the detached state by the detach-local-cache command when the detachment process is complete.

Local-Cache-Identifier States:

A local-cache identifier is in the assigned state when the associated assigned bit in the local-cache-identifier vector is one. A local-cache identifier is placed in the assigned state by the attach-local-cache command. A local-cache identifier is in the unassigned state when the associated assigned bit in the local-cache-identifier vector is zero. A local-cache identifier is placed in the unassigned state by the detach-local-cache command, depending on LCID-unassignment control.

Cache-Structure Operands:

Operands are presented to SES management logic 110 as request operands on commands sent by attached CPCs. Operands are presented to attached CPCs as response operands to commands or request operands to the associated SES-support facility. The cache-structure operands related to SES store-multiple or store-in cache coherency are summarized in the following:

Assignment Control (AC):

The assignment control is a one bit value that controls the name-assignment process. The two possible values are: 0 suppress assignment; 1 assign when required Attachment Information (AI):
 A value set by the program when the local cache is attached.
Castout Process ID (CPID):
 A value that identifies a local cache castout process in conjunction with the LCID of the local cache.
Change Control (CHGC):
 The change control is a one-bit value that selects which process is used for writing the data. The two possible values are: 0 write data unchanged; 1 write data changed.
Castout-Lock Control (COLC)
 The castout-lock control is a one-bit value that indicates that the data being written is also being castout and castout lock serialization is required. This bit is only meaningful when the change control (CHGC) bit is zero.
Complement-Copy-Invalidation Control (CCIC)
 The complement-copy-invalidation control is a one-bit value that indicates that the complement copy invalidation is performed when the data is written unchanged to SES. This bit is only meaningful when the change control (CHGC) bit is zero.
Data-Area Size (DAS):
 A value that specifies the size of the data area as an integral multiple of the data-area-element size. Valid values range from 0 to the maximum data-area size.
Data-Block Size (DBS):
 A value that specifies the size of the data block as an integral multiple of 4096-byte units.
Invalidated Local-Cache-Entry Number (ILCEN):
 A value that specifies the local-cache-entry number replaced by the local-cache-entry registration process.
ILCEN Validity Indicator (ILCENV):
 A one-bit value that, when one, indicates the validity of the invalidated-local-cache-entry-number response operand.
LCID-Unassignment Control (LUC):
 A one-bit value that controls the unassignment of the local-cache identifier. When the value is B'1', the local-cache identifier is unassigned, and the local-cache controls are reset. The LCID value is available for assignment. When the value is B'0', the LCID vector and the local-cache controls are not updated.
Local-Cache-Entry Number (LCEN):
 An unsigned binary integer that specifies a local-cache entry.
Local-Cache-Entry-Registration Control (LCERC):
 A one-bit value that controls the local-cache-entry-registration process.
Local-Cache Identifier (LCID):
 An unsigned binary integer that identifies a local-cache.
Local-Cache Token (LCT):
 A value that identifies a local cache in a CPC. The value of the local-cache token must identify a defined local cache.
Maximum Data-Area Size (MDAS):
 A value that specifies the maximum allowable size of a data area as an integral multiple of the data-area-element size.
Name (N):
 A value that identifies a data block in the storage hierarchy.
Name Mask (NM):
 A value that determines the bytes used for name comparison.
Name-Replacement Control (NRC):
 A one-bit value that controls the name-replacement process: 0 suppress replacement; 1 replace name.
Replacement Name (RN):
 A value that identifies a data block being replaced in a local cache.

Restart Token (RT):
 A value that controls the processing of an operation against the directory that spans multiple commands.
Structure Size (SS):
 A value that specifies the number of 4096-byte units of SES storage allocated for the cache structure.
Total-Data-Area-Element Count (TDAEC):
 A value that specifies the number of data-area elements allocated for the cache.
Total-Directory-Entry Count (TDEC):
 A value that specifies the number of directory entries allocated for the cache.
Target Directory-to-Data Ratio (TDTDR):
 A two-byte field consisting of two one-byte unsigned binary integers that specify the relative number of directory entries to data-area elements. The integer specified in the first byte divided by the sum of the two numbers represents the fraction of the total count of directory and data-area elements associated with the directory entries. The integer specified by the second byte divided by the sum of the two numbers represents the fraction of the total count consisting of data-area elements.
Cache-Structure Processes:
 The following processes are invoked by various cache-structure commands. The set of processes invoked by a command are listed in the command description.
Data-Area-Element Assignment:
 Data-area-element assignment is processed for the specified name, and data-area size by obtaining an ordered collection of available data-area elements, attaching them to the directory entry, setting the data bit to one, and setting the data-area-size object to the value of the DAS operand. When insufficient data-area elements are available, data areas are reclaimed to satisfy the request. Each reclaimed data area is cleared, the data-area elements are attached to the directory entry, and any remaining data-area elements are placed on the free list of data-area elements.
Directory and Data-Area Element Creation:
 The available storage assigned to the cache structure is apportioned to create directory entries and data-area elements. The number of each that is created is a function of the amount of available storage, the specified directory-to-data ratio, the data-area-element characteristic, and the specified structure size. The resulting number of directory entries and data-area elements are placed in the total-directory-entry-count (TDEC) and total-data-area-element-count (TDAEC) control fields, respectively.
 Once the total-directory-entry count is established, the total storage available for the creation of data-area elements is determined by subtracting the directory storage. The storage required for data-area elements is determined by the data-area-element characteristic, and the target directory-to-data ratio (TDTDR).
Local-Cache-Entry Deregistration:
 A local-cache entry is deregistered by providing the specification of the entry and providing a replacement-name value. The local-cache entry is removed from the local-cache register for the name by setting the row corresponding to the local-cache identifier to the invalid state. The program does not serialize on the replacement name, but rather on the local-cache-entry number. Thus, the SES must test the value of the local-cache-entry number in the local-cache register for the replacement name prior to setting the row invalid. If the contents do not match the value of the local-cache-entry number, no action is taken. The replacement name has been registered in a different local-cache entry by a separate process.

Figure 14A:
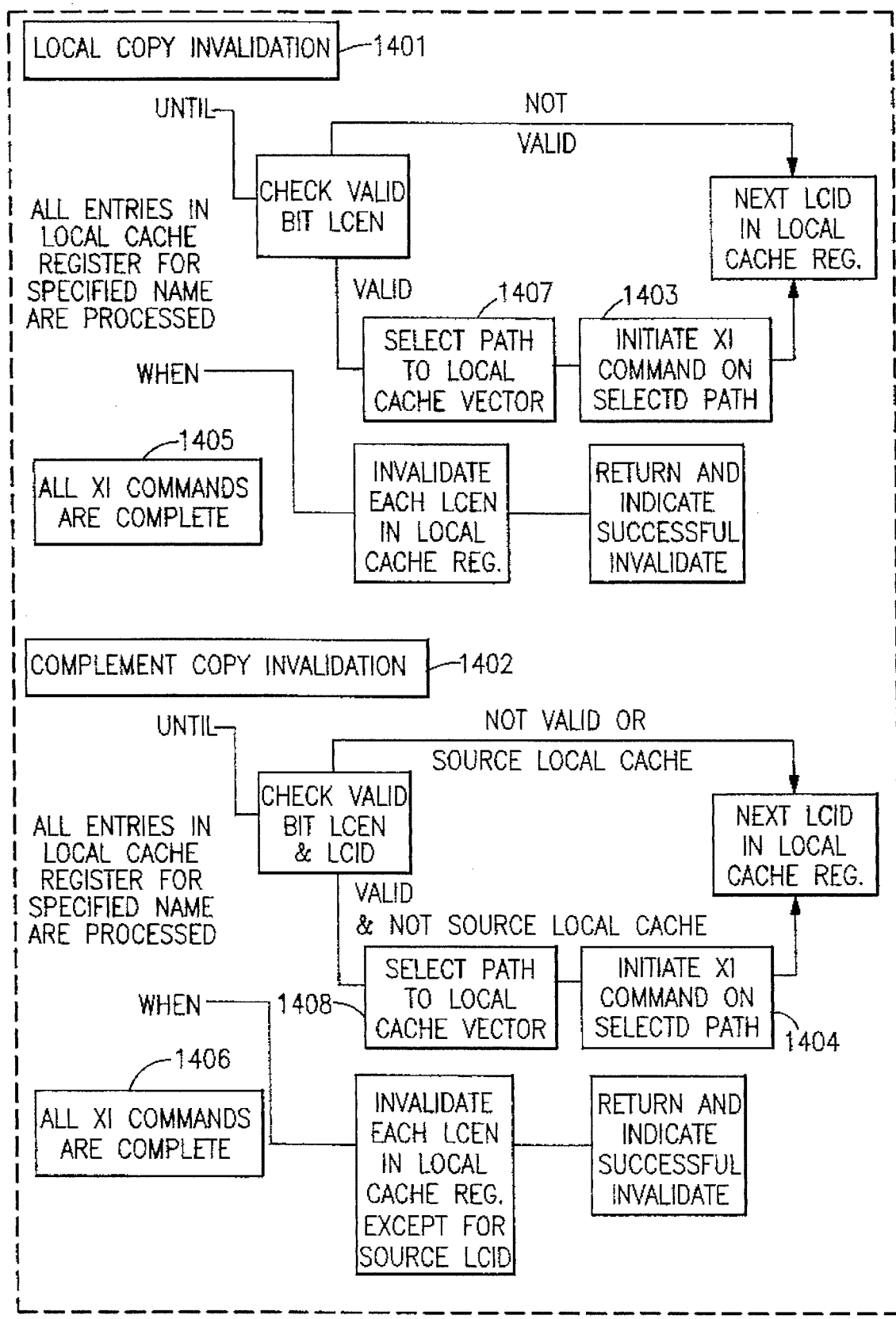
FIG. 14A and FIG. 14B provides a flow diagram that represents a local cache entry invalidation.
Figure 14B:
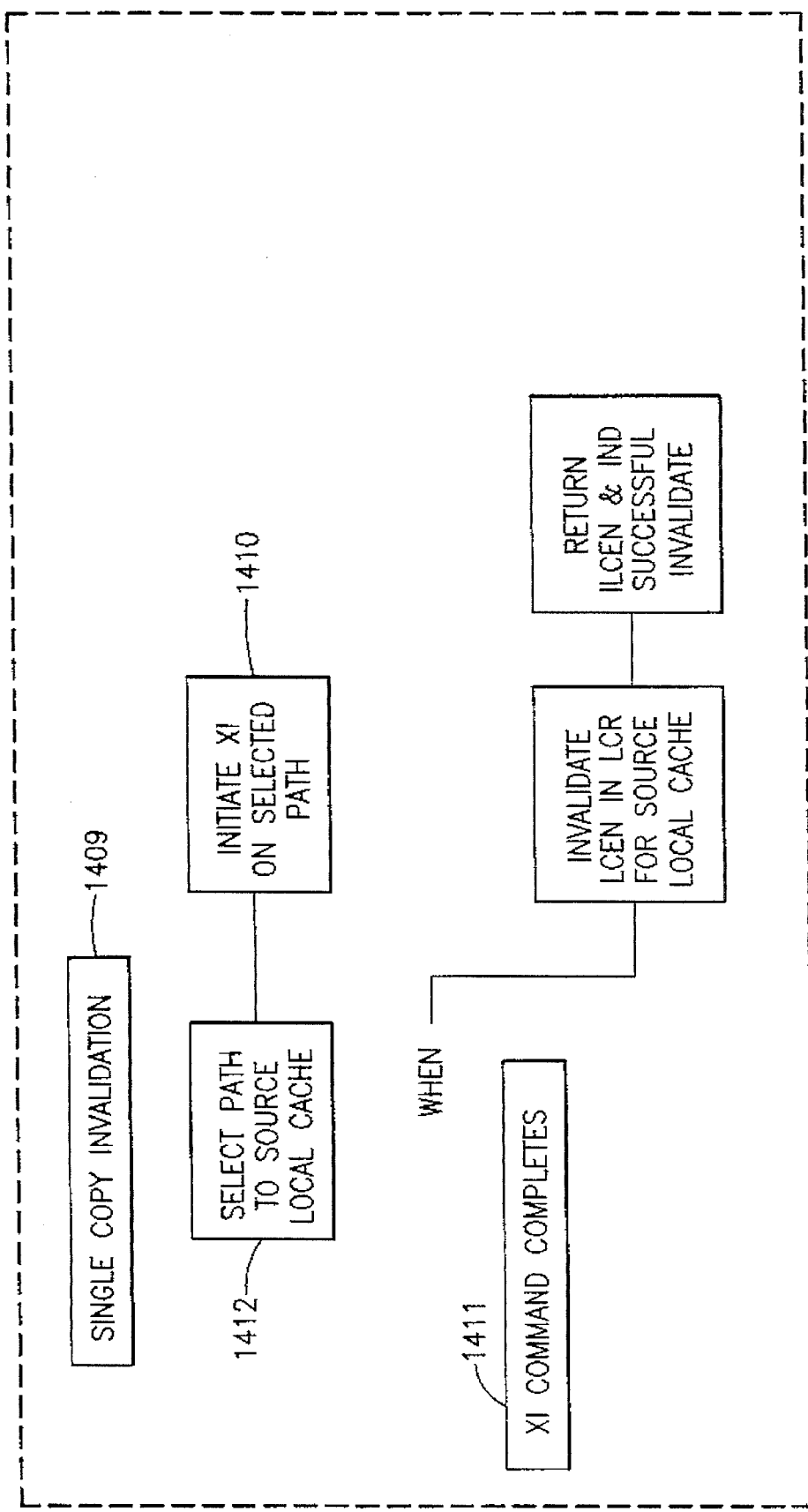

Local-Cache-Entry Invalidation:

Three separate processes invalidate local-cache entries for a specified name as shown in FIGS. 14A and 14B. Local-copy invalidation invalidates all local copies of the specified named data block (1401) Complement-copy invalidation invalidates all the local copies of the specified named data block with the exception of the local cache identified by the LCID request operand (1402). Single-copy invalidation invalidates one local copy for a specified local cache (1409).

The first two processes invalidate a list of local-cache entries, with at most one entry invalidated in a particular local cache. The last process invalidates a list containing only one local-cache entry. Each local-cache entry on the list is invalidated by invalidating the local-cache-entry number in the local-cache register and generating a cross-invalidate command (1403, 1404, and 1410) for the system containing the local cache. When all the local-cache-entry numbers have been invalidated and when all the generated cross-invalidate commands are completed (1405, 1406, and 1411), the process is completed. The local-copy invalidation process, the complement-copy invalidation process, and the single copy invalidation process must be completed prior to command completion.

Processing of a generated cross-invalidate command consists of message-path selection (1407, 1408 and 1412) and cross-invalidate-command processing (1403, 1404 and 1410). One or more cross-invalidate commands are initiated for each local copy of the specified named data block to be invalidated. A message path is selected from the path group designated by the system-identifier value in the local-cache controls. When the primary command completes, the generated cross-invalidate commands are completed.

When a cross-invalidate command cannot be successfully delivered to a system; that is, the message times out, the SES facility must attempt to deliver the command over each of the remaining active message paths in the path group until either a response block is received or all paths in the path group have been made marked in error in the CPC and inactive in SES.

Broadcasting the same cross-invalidate command on multiple paths in the path group will allow for faster completion of the local-cache-entry process when link errors are present. However, the broadcast protocol should be limited to situations where a link has been marked in error after an unsuccessful attempt to send a single cross-invalidate command for the local-cache entry. Broadcasting in non-error situations could add significant load to the link and should be avoided.

When the path group is empty at the time of path selection, or when all paths in the path group are inactive, the generated cross-invalidate command completes without initiating a link operation.

Figure 12:
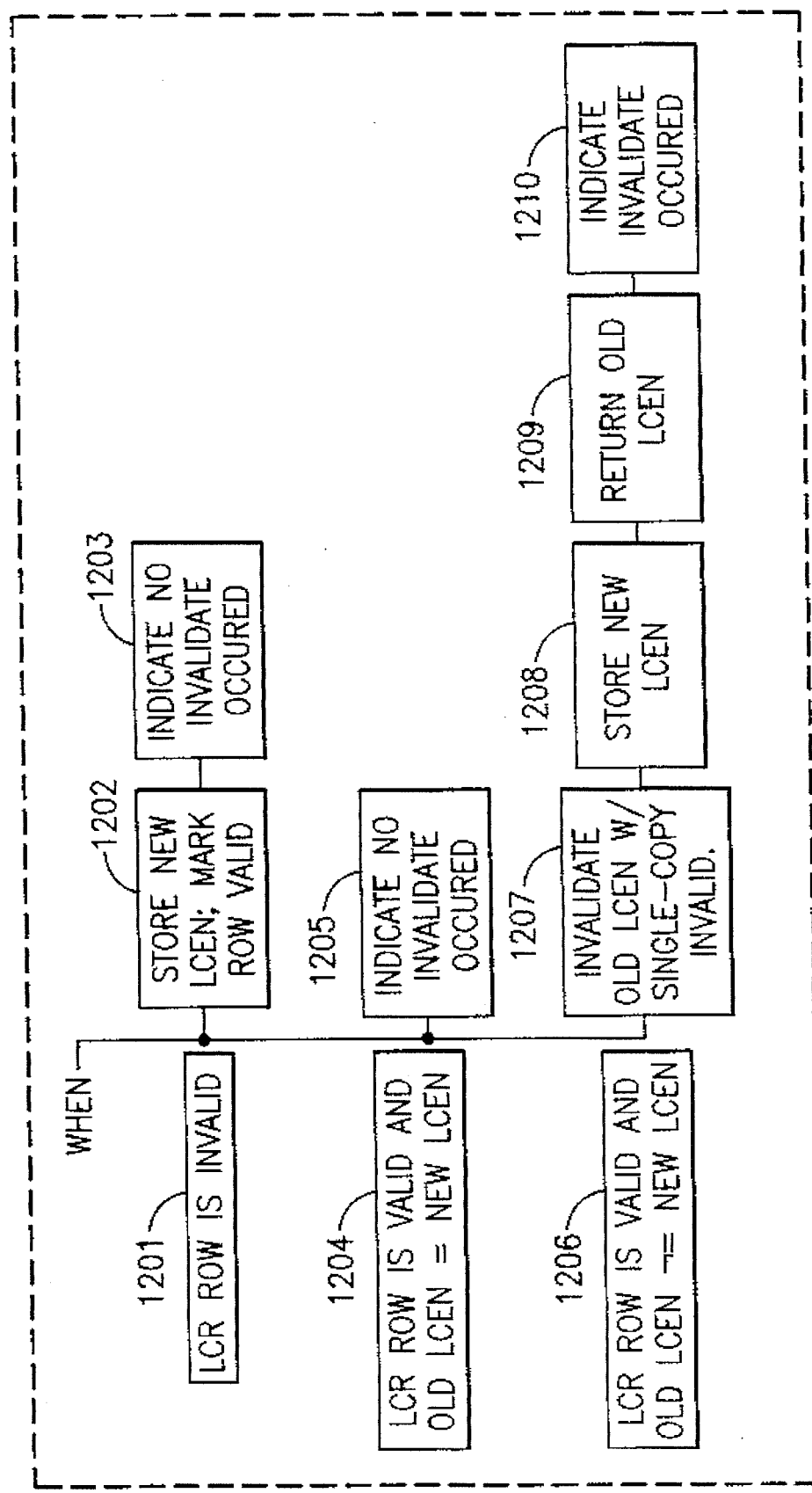
FIG. 12 provides a flow diagram that represents a local cache entry registration.

Local-Cache-Entry Registration:

A local-cache entry is registered by providing the specification of the entry and providing a name as shown in FIG. 12. A local-cache entry is specified by a local-cache-entry number and a local-cache identifier. The local-cache entry is added to the local-cache register for the name by updating the local-cache-entry-number field in the row corresponding to the local-cache identifier.

When the local-cache-register row is in the invalid state (1201), the specified LCEN is stored in the local-cache-entry-number field and the row is marked valid (1202). The ILCEN-validity-indicator response operand is set to zero (1203).

When the local-cache-register row is in the valid state, the specified LCEN is compared with the value of the local-cache-entry field. When the compare is equal (1204), no change is made to the local-cache register and the ILCEN-validity-indicator response operand is set to zero (1205). When the compare is not equal the following occurs (1206):

The registered local-cache-entry number is invalidated by the single-copy invalidation process (1207).

The specified local-cache-entry number is stored in the local-cache-entry field and the row is marked valid (1208).

The value of the invalidated local-cache-entry number is placed in the ILCEN response operand (1209) and the ILCEN validity indicator is set to one.

The local-cache-registration process is completed with an LCEN-replacement performed condition (1210).

Name Assignment:

A name assignment is processed for the specified name by obtaining an invalid directory entry, marking it valid, initializing the name and attaching the directory entry to the directory.

When no invalid directory entries are available, a valid directory entry may be reclaimed by the SES, cleared of its current contents, and attached to the directory. The oldest unchanged directory entry is reclaimed. The directory entry reclaim may result in cross-invalidate signals.

Name Comparison:

The name comparison is a byte-level comparison and is controlled by the mask field. The bits, left to right, in the mask field correspond one for one with the bytes, left to right, of the name field. The comparison proceeds left to right, byte by byte. When the corresponding bit in the mask is one, the bytes are compared; otherwise, the comparison is not made and the operation continues with the next byte.

Writing the Data Changed:

A change control value of one indicates that the data is written in a changed state from the local cache specified by the LCID value to the SES-cache. The change of the data area is synchronized with the remaining local caches by invalidating the complement copies. The remainder of the operation includes storing the data area as changed and processing a change signal.

The data is stored into the assigned ordered collection of data-area elements. If the write process is to an existing data area and if the data-area-size operand is smaller than the data-area-size object, the data block is written into the lowest ordered data-area elements, the remaining data-area elements are placed on the free list of data-area elements, and the data-area-size object in the directory entry is updated with the value of the data-area-size operand.

If the write process is to an existing data area and if the data-area-size operand is larger than the data-area-size object, additional data-area elements are assigned to the directory entry, the data block is stored in the data area, and the data-area-size object in the directory entry is updated with the value of the data-area-size operand.

Change-Signal Processing:

A change signal is processed for a specified data area and castout class. As part of change signal processing, the change bit is set in the directory entry indicating the data is cached as changed. The setting of the change bit in the directory entry must be done before the command is completed. The castout class is stored in the directory and the entry is queued on the castout class queue.

Writing the Data Unchanged:

A change control value of zero indicates that the data is written unchanged to the SES-cache. This includes storing the data area with the change bit in the directory entry set to zero.

When the castout-lock control (COLC) request operand is one, then the data is marked as locked-for-castout by storing the value of the LCID operand in the first byte of the castout lock, by storing the value of the CPID operand in the second byte of the castout lock, and by setting the castout-lock state in the directory entry to B'10' (write with castout) to indicate this is a store-multiple write operation. While the castout lock is held, the data entry is considered to be changed in the SES cache (with respect to the version of the data on DASD).

When the complement-copy-invalidation control request operand is one, then the data is synchronized with the remaining local caches by invalidating the complement copies.

The data is stored into the assigned ordered collection of data-area elements. If the write process is to an existing data area and if the data-area-size operand is smaller than the data-area-size object, the data is written into the lowest ordered data-area elements, the remaining data-area elements are placed on the free list of data-area elements, and the data-area-size object in the directory entry is updated with the value of the data-area-size operand.

If the write process is to an existing data area and if the data-area-size operand is larger than the data-area-size object, additional data-area elements are assigned to the directory entry, the data block is stored in the data area, and the data-area-size object in the directory entry is updated with the value of the data-area-size operand.

Cache-Structure Commands:

The following commands are described in reference to actions taken at the SES and against SES objects as shown in the process flow diagrams for:

Attach Local Cache—FIG. 5

Figure 6:
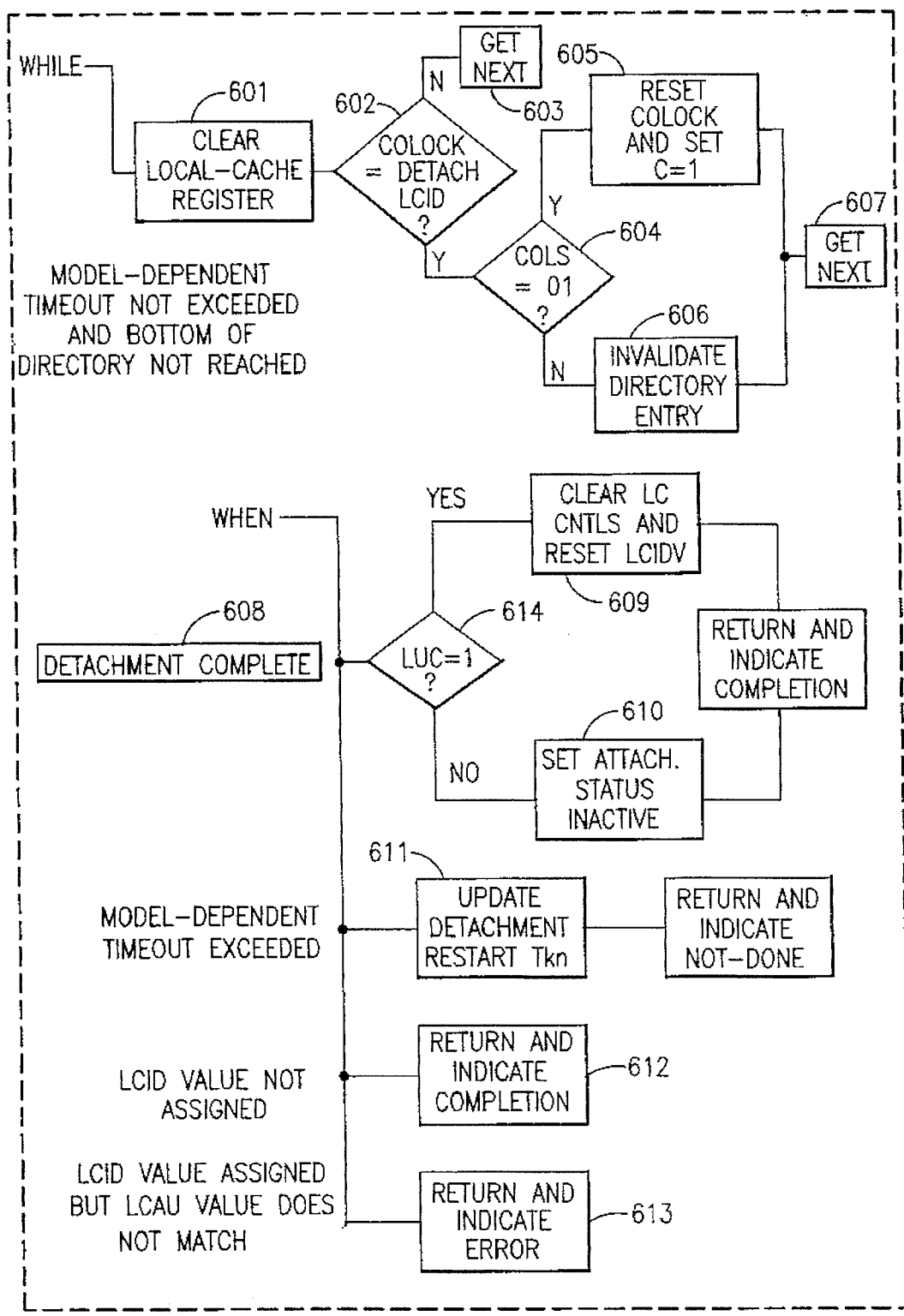
FIG. 6 provides a flow diagram that represents a detach local cache command.

Detach Local Cache—FIG. 6

Figure 7:
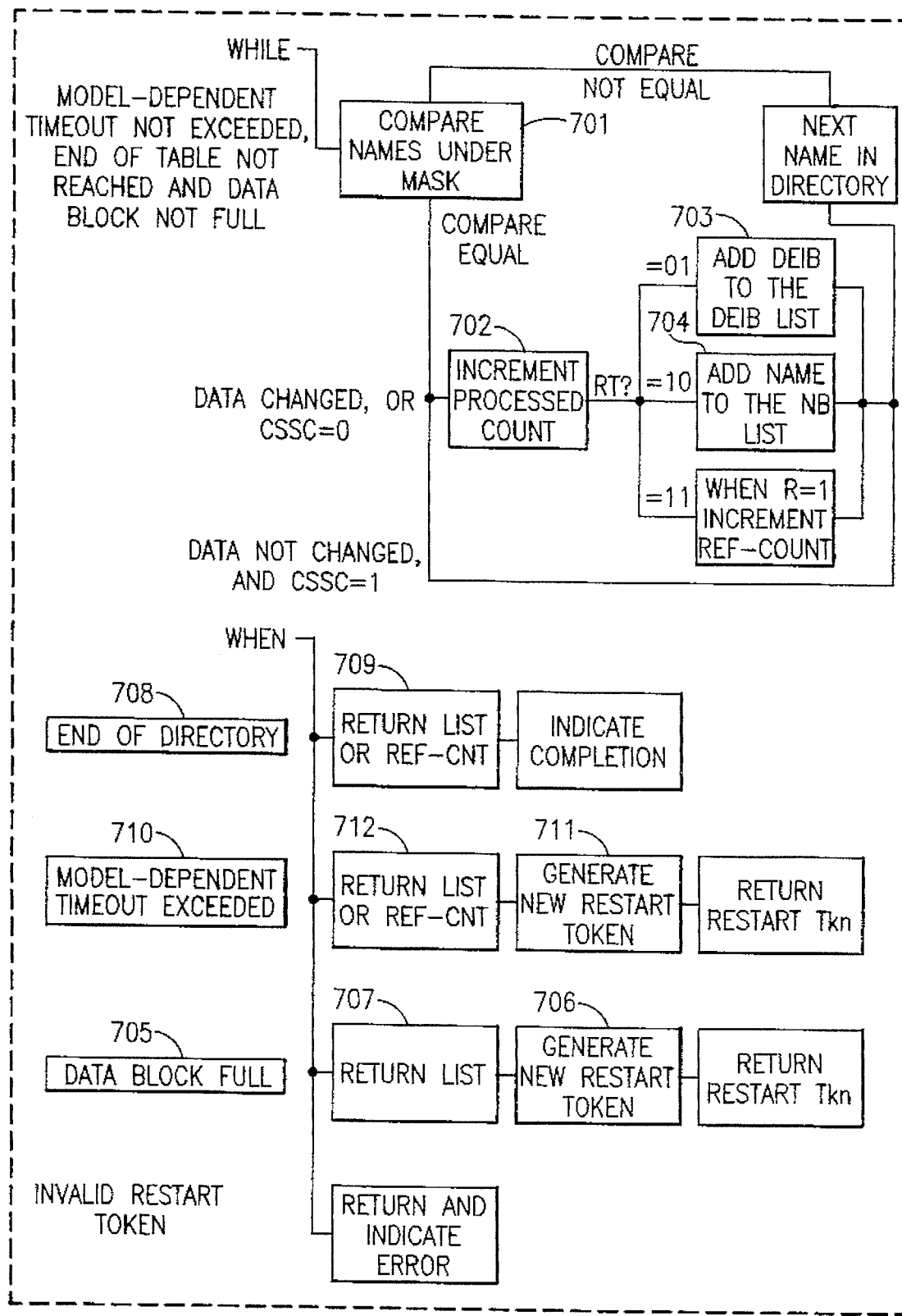
FIG. 7 provides a flow diagram that represents a read directory command.

Read Directory—FIG. 7

Figure 9:
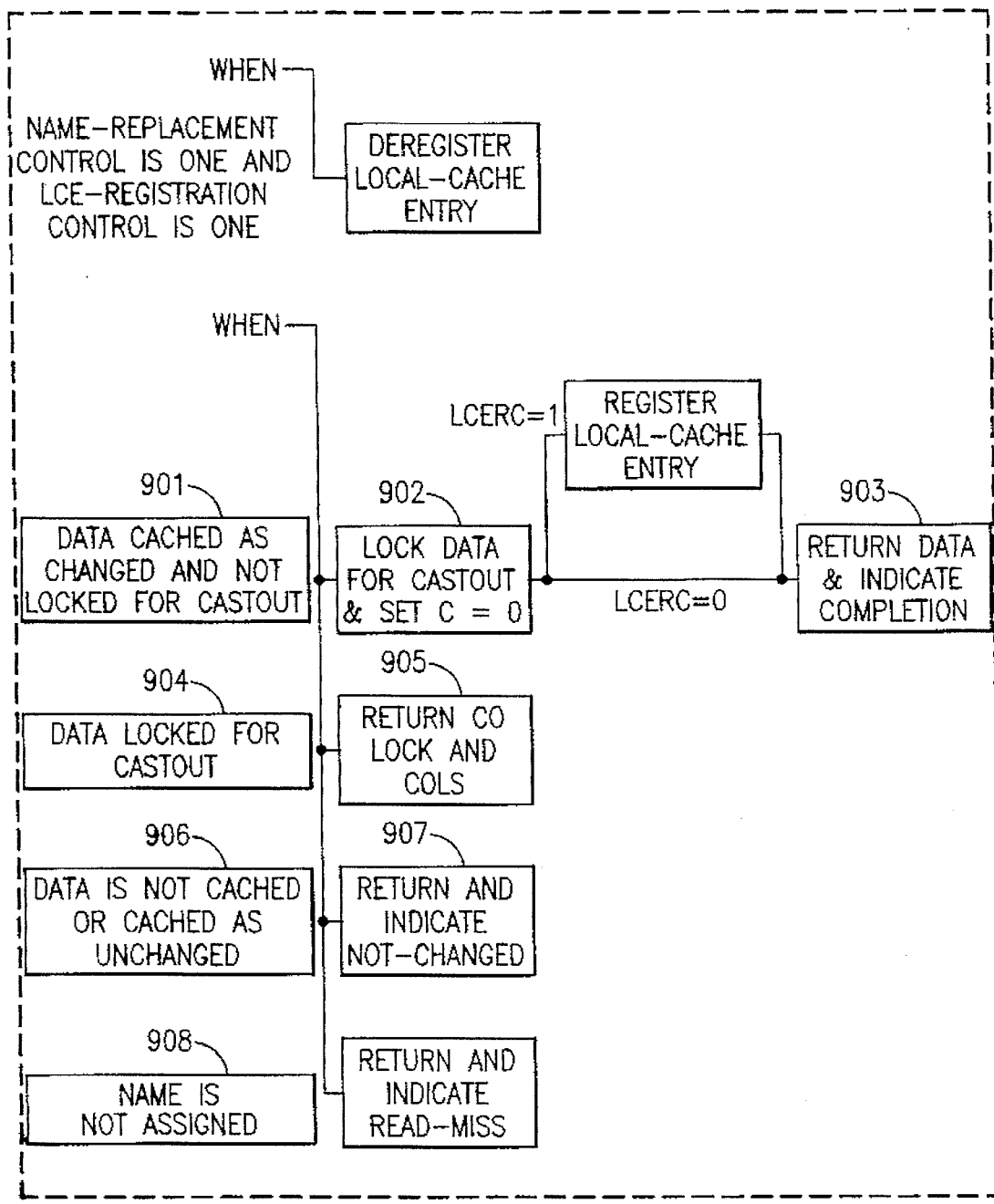
FIG. 9 provides a flow diagram that represents a read for castout command.

Read For Castout—FIG. 9

Figure 13:
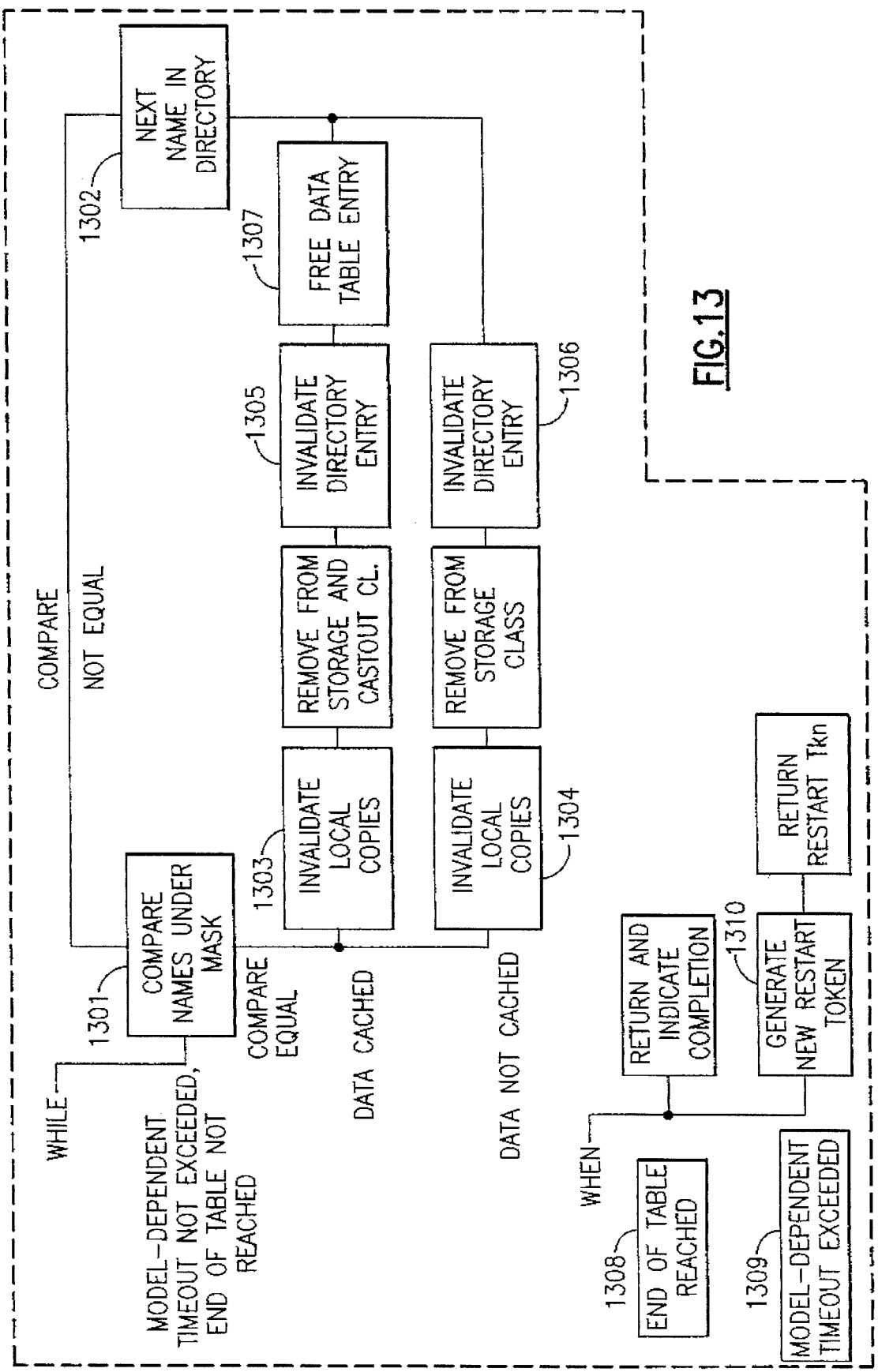
FIG. 13 provides a flow diagram that represents an invalidate name command.

Invalidate Name—FIG. 13

Figure 11:
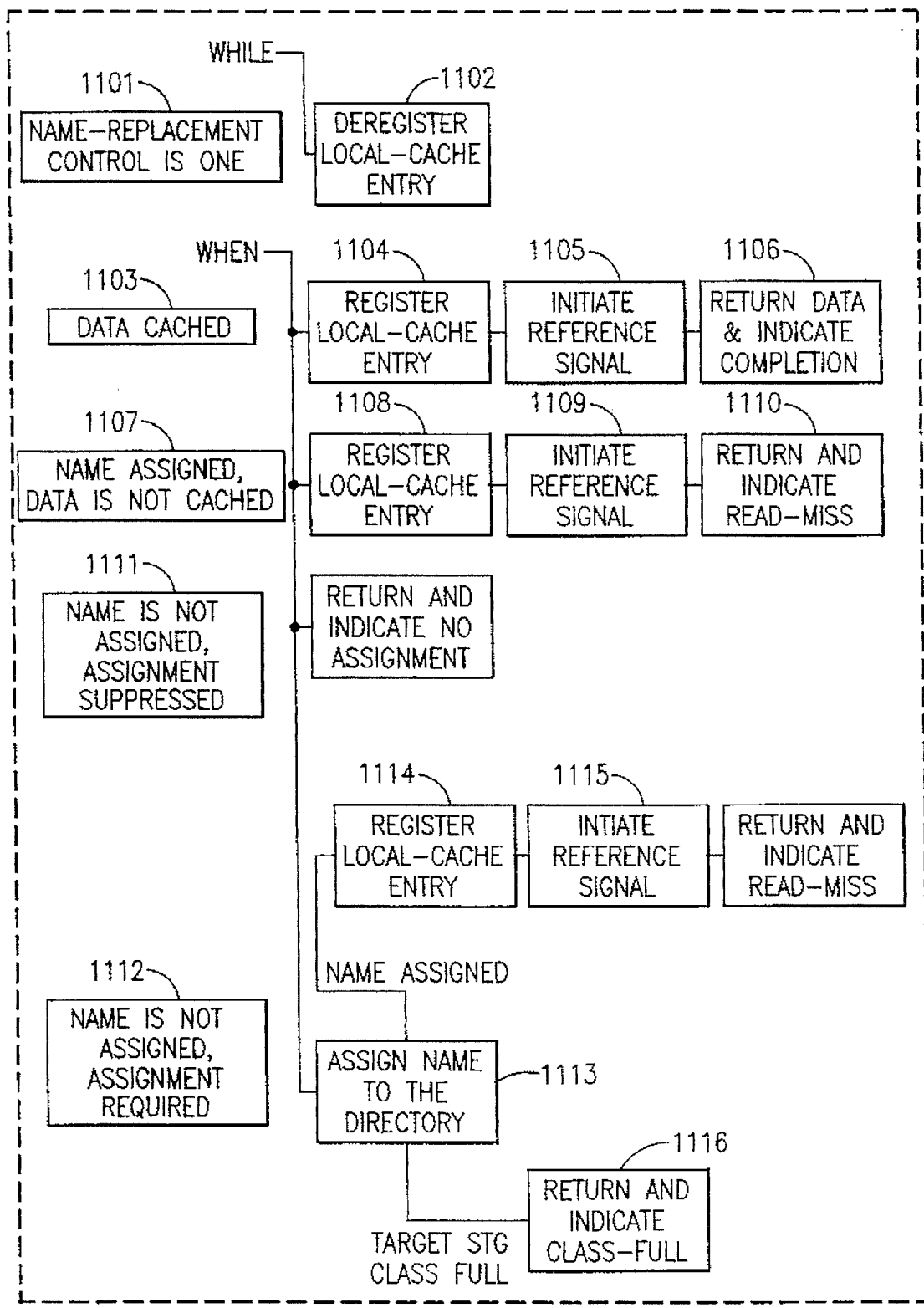
FIG. 11 provides flow diagrams that represent a read and register command.

Read and Register—FIG. 11

Figure 10:
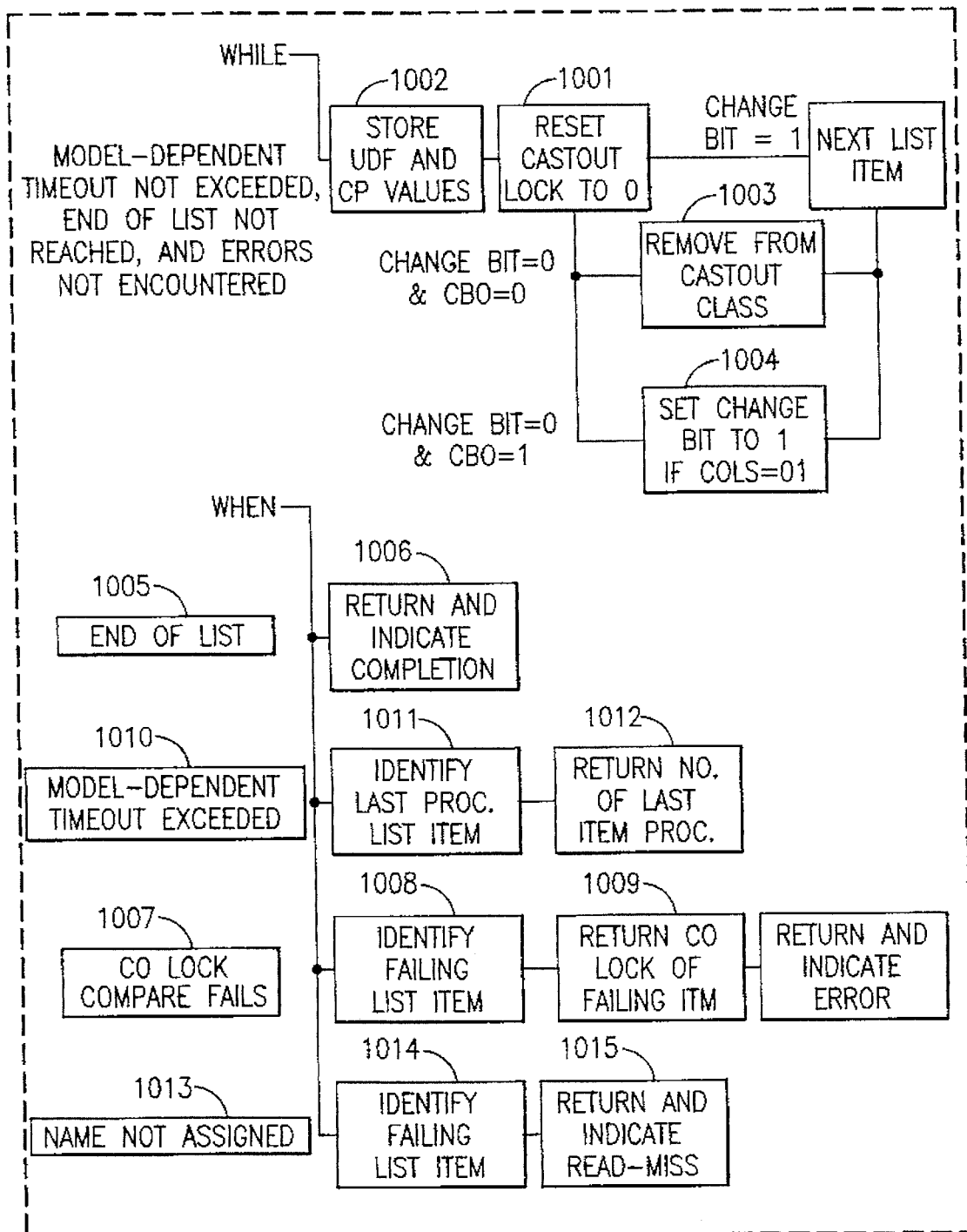
FIG. 10 provides a flow diagram that represents a unlock castout locks command.

Unlock Castout Locks—FIG. 10

Write and Register—FIGS. 15A, 15B, 16, and 17

Figure 18:
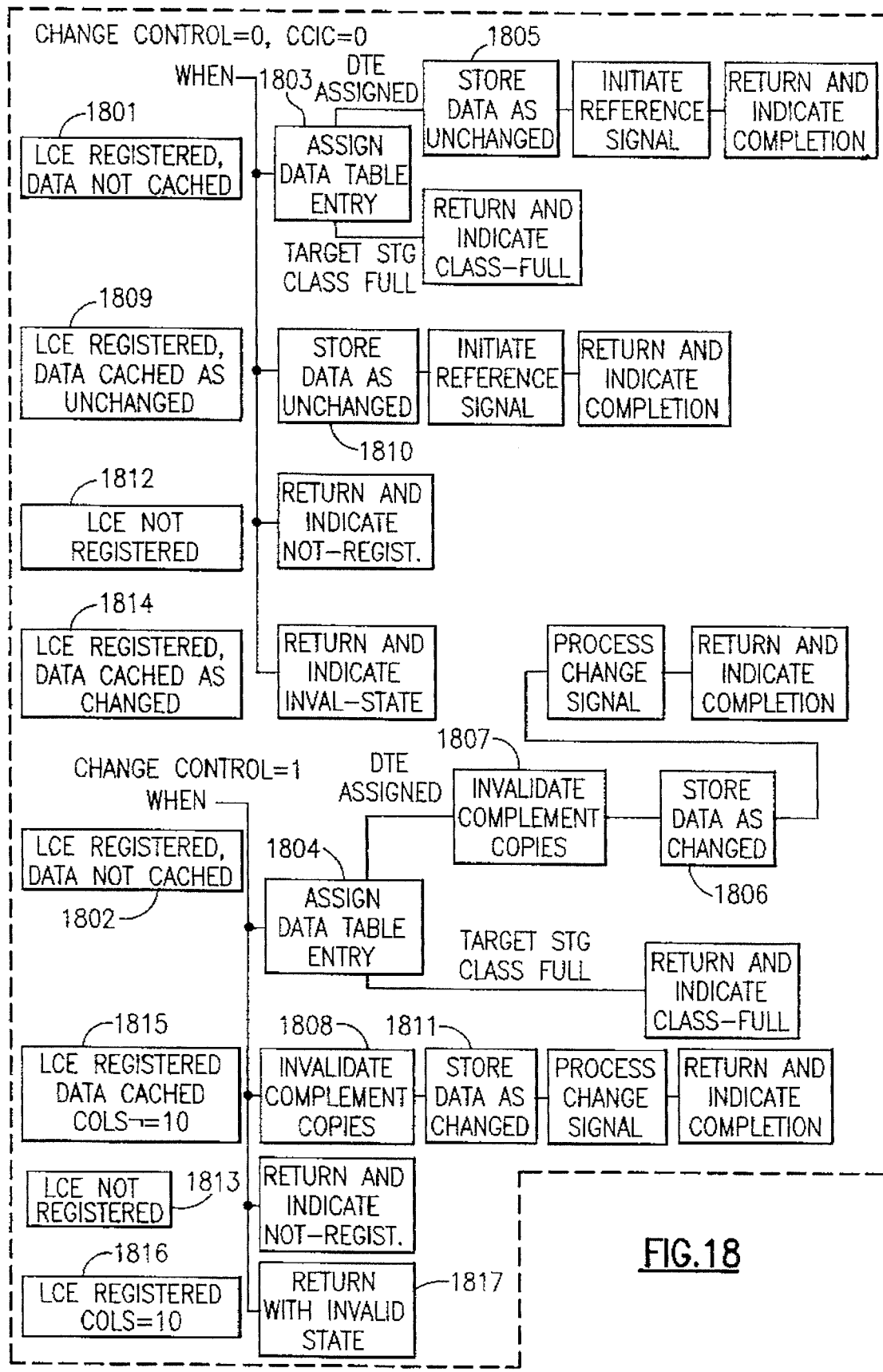
FIG. 18 provides a flow diagram that represent a write when register command for a store-in cache when the SES change control indicates a changed record state.
Figure 19A:
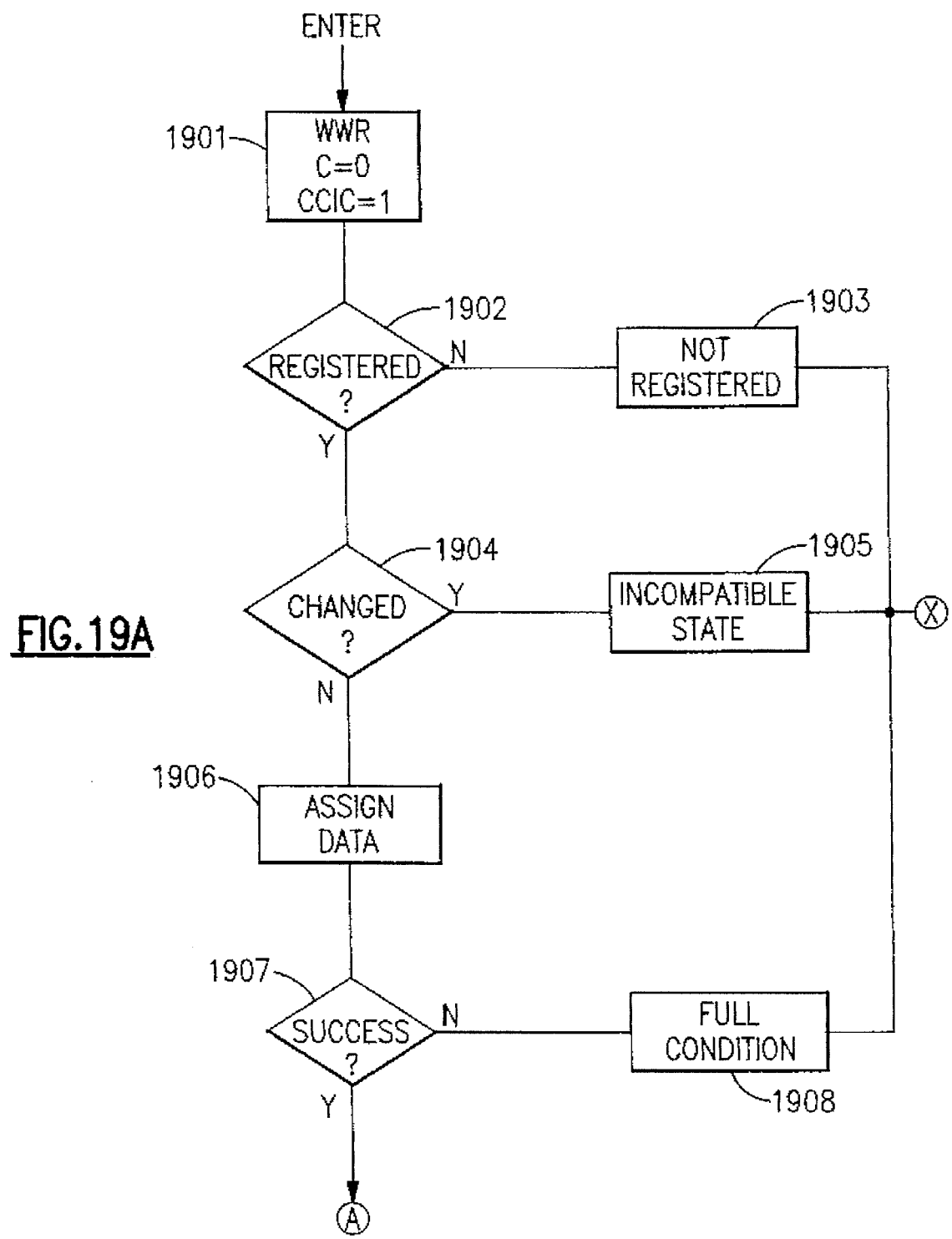
FIGS. 19A and 19B provide a flow diagram that represent a write when register command for a store-multiple cache.
Figure 19B:
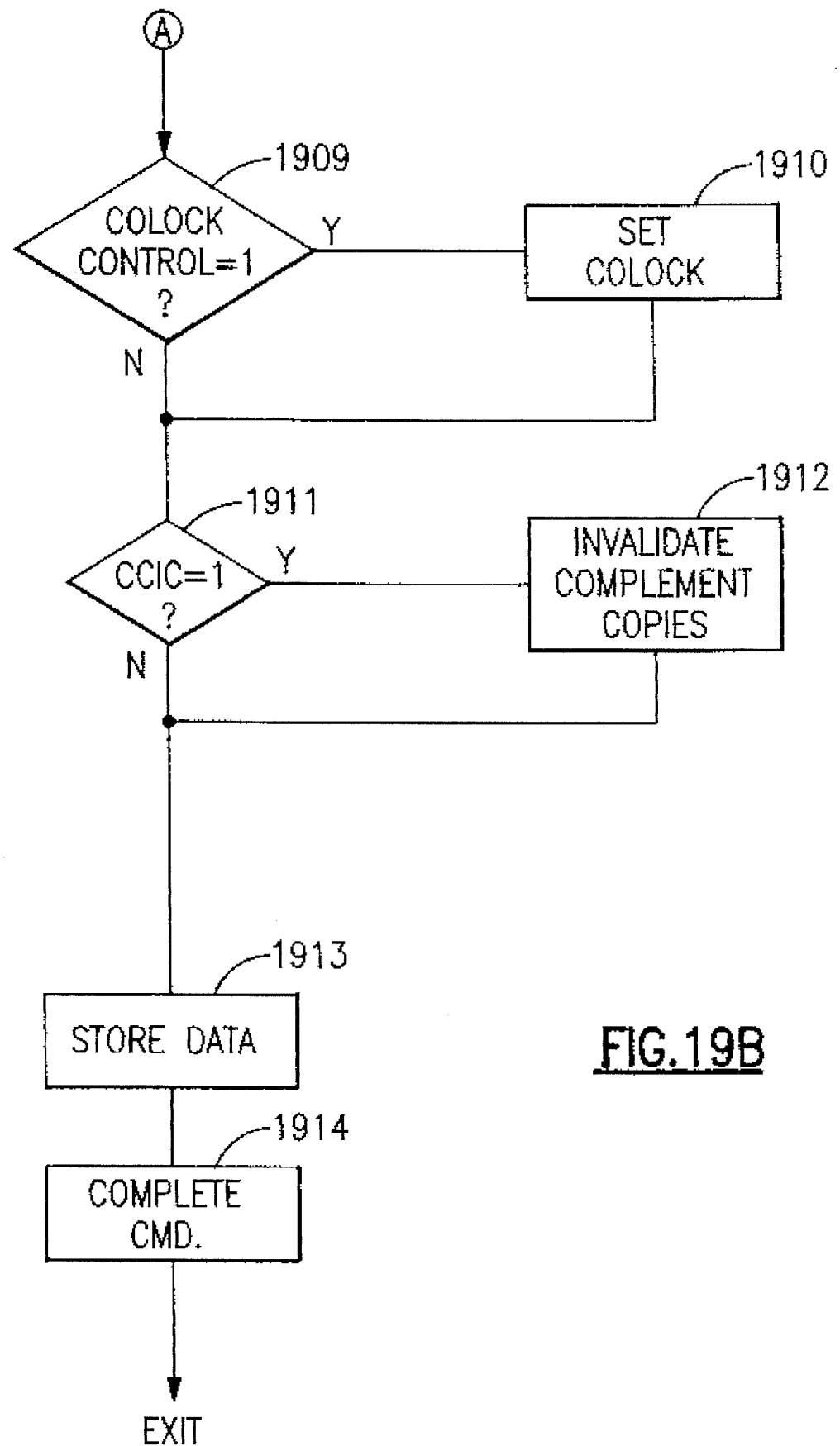

Write When Registered—FIGS. 18, 19A, and 19B

Attach Local Cache:

FIG. 5 is a process flow diagram for the Attach Local Cache (ALC) command. The attach-local-cache command identifies a local cache to an existing SES cache, initializes the local-cache controls, and assigns the specified local-cache identifier.

Attaching a local cache to a cache structure includes placing the attachment status in the active state (503), setting the local-cache controls (501), assigning the specified local-cache identifier (502) when it is not already assigned, and creating a row in the local-cache register for each directory entry. The local-cache controls include the local-cache token, the detachment-restart token, the attachment information, the attachment status, and the system identifier. The value of the system identifier is obtained from the message-path status vector for the message path used to communicate the ALC command.

Detach Local Cache:

FIG. 6 is a process flow diagram for the Detach Local Cache command. The detach-local-cache command removes the identification of a local cache to a SES cache and frees the specified local-cache identifier.

The directory is searched starting with the directory entry specified by the detachment restart token in the local-cache controls. When the detachment restart token is zero, detach processing is initiated. When the detachment restart token is not zero, detach processing is resumed at the directory entry specified in the token.

Each directory entry is processed as follows:

The local-cache register is updated by clearing the row assigned to the local cache specified by the LCID request operand (601).

The castout lock is tested (602). When the first byte of the castout lock is not set to the value specified in the LCID operand, processing proceeds with the next directory entry 603. When the first byte of the castout lock is set to the value specified in the LCID operand, and the castout-lock state is B'01' (read for castout) (604), the castout lock and the castout lock state are both reset to zero, the change bit is set to one, indicating the data is changed (605).

When the first byte of the castout lock is set to the value specified in the LCID operand, and the castout-lock state is B'10' (write with castout) indicating the castout lock was set by a store-multiple write operation, then the directory entry is invalidated as follows (606):

the complement-copy invalidation process is executed for the indicated data area and the specified local cache ID, the entry is detached from the directory and marked invalid, the data area is detached from the directory entry and the data area elements are made available for re-use.

Processing then proceeds with the next directory entry (607).

When the entire directory has been processed (608) and the local-cache unassignment control is one (614), the designated bit in the LCID vector and the local-cache controls are reset (609). Otherwise, the attachment status is set to inactive/detached (610).

When the model-dependent timeout value is exceeded, the detachment restart token is updated in the local-cache controls (611).

When the local-cache identifier is not assigned, the command is completed with an indicative return code (612). If the compare local cache authority value (CLCAU) does not match the local cache authority for the specified user (LCAU) the command is immediately completed with an indicative return code (613).

Detaching a local cache may require multiple executions of the detach-local-cache command. The directory may change during the detachment process. The set of directory entries that must be processed before the detachment is complete consist of the valid directory entries that exist at the initiation of detach processing and remain valid. Directory entries that are added or deleted after the detachment is initiated do not need to be processed. A directory entry need only be processed once. Any directory entries updated after they are processed do not need to be processed a second time.

Invalidate Name:

FIG. 13 is a process flow diagram of the Invalidate Name command. The invalidate-name command detaches all names which match the input name under the mask condition from the SES-cache directory.

The name comparison is successful when all the unmasked bytes are equal (1301). A zero mask causes all names to be invalidated. A mask of all ones identifies a single name to be invalidated.

The directory is scanned (1302). For each name assigned to the directory that matches the input name under the mask condition, local-copy invalidation is performed (1303 and 1304). The name is detached from the directory and marked as invalid (1305 and 1306). When the data is cached, the data elements are detached from the directory, the contents are cleared, and the entry is made available for reuse (1307).

The directory scan is controlled by the restart-token request operand. A token value of zero starts the processing, and a nonzero token value restarts the processing from the place designated by the token. Processing is completed when the entire directory has been processed or when a model-dependent timeout has been exceeded. When the end of the directory is reached, the command is complete (1308). When a model-dependent timeout occurs before the end of the table is reached (1309), a restart token is generated (1310).

Read Directory:

The processes invoked by the read-directory-under-mask command are summarized in FIG. 7. The read-directory command scans the directory and returns a list of directory-entry-information blocks or returns a list of name blocks. Directory entries are processed when the name field matches the input name under the mask condition and the changed state matches the requested state. Directory entries are processed when the name field matches the input name under the mask condition and the changed state matches the requested state (701). The name comparison is successful when all the unmasked bytes are equal. A zero mask causes all names to be processed.

When the change-state-selection control is zero, all directory entries which match the name under the mask condition are processed. When the change-state-selection control is one, only entries which are changed or locked for castout and match the name under the mask condition are processed.

The directory is scanned. A directory-entry information block is added to the list of directory blocks to be returned (NB) (703 and 704) and the processed count (PC) is increased by one when the request is for changed data, and the name in the directory entry matches the input name under the mask condition, and the changed state of the data matches the change-state-selection criteria. The directory scan is controlled by the restart-token request operand. A token value of zero starts the processing, and a nonzero token value restarts the processing from the place designated by the token. Processing is completed when the data block is full, when the entire directory has been processed, or when a model-dependent timeout has been exceeded. When the data block is full (705), a restart token is generated (706) and returned along with the list of directory blocks to be returned (707), and the processed count. When the end of the directory is reached (708), the list of directory blocks to be returned (709), and the processed count are returned to the program. When a model-dependent timeout occurs before the end of the directory is reached (710), a restart token is generated and returned (711) along with the list of directory blocks to be returned (712), and the processed count.

The format of the directory-entry information block (DEIB) is shown in FIG. 8.

Scanning a directory may require multiple executions of the read-directory command. The directory may change during the scanning process. The set of directory entries that must be processed before the scanning is complete consists of the valid directory entries that exist at the initiation of directory-scan processing and remain valid. Directory entries that are added or deleted after the scanning is initiated do not need to be processed. A directory entry need only be processed once. Any directory entries updated after they are processed do not need to be processed a second time.

Read For Castout:

The processes invoked by the read-for-castout command are summarized in FIG. 9. The read-for-castout command returns the contents of a named data area to the local cache and sets the castout lock in the directory entry. The read-for-castout is a store-in cache command and sets the castout lock state accordingly to the 'read for castout' state.

When the data is cached and changed but not locked for castout (901) (i.e. the change bit is on in the directory entry), the data is marked as locked-for-castout. This is achieved by storing the value of the LCID operand in the first byte of the castout lock, by storing the value of the CPID operand in the second byte of the castout lock, by setting the castout lock state to the 'read for castout' state '01'b, and by resetting the change bit to zero (902). The data and response code indicating completion is returned (903). The data is returned to the main-storage location specified by the data address in the message-command block.

When the data is locked for castout (904), the value of the castout lock and the castout lock state is returned (905).

When the data is not cached, or cached but not changed (906), the command is completed with an exception response code (907).

When the name is not assigned to the directory (908) an error response code is returned.

Read and Register:

FIG. 11 is a process flow diagram of the Read and Register command. The read-and-register command returns the contents of a named data area to the local cache and registers the local-cache entry. When the data is not cached, only the registration operation is performed. The read-and-register command also assigns the name to the directory when the name is not currently assigned.

When the name-replacement-control request operand (NRC) is one (1101), the local-cache entry designated by the replacement-name and local-cache-identifier request operands is deregistered (1102). When the name-replacement control is zero, no deregistration is performed.

When the data is cached (1103), the local-cache entry is registered (1104) and the data along with the change bit is returned. In addition, the castout lock value and the castout lock state value are returned (1106).

When the name is assigned to the directory but the data is not cached (1107), the local-cache entry is registered (1108).

When the name is not assigned to the directory and directory assignment is not suppressed (1112), a directory-entry name-assignment operation is performed (1113). If the cache is not full, a directory entry is assigned, and the local-cache entry is registered (1114).

When the name is not listed in the directory and assignment is suppressed (1111), the command is completed and an exception response code is returned.

Unlock Castout Locks:

The processes invoked by the unlock-castout-locks command are summarized in FIG. 10. The unlock-castout-locks command resets the castout lock to zero and stores the user-data field in the directory entry for a list of names.

Each list item, starting with the item designated by the request operand, is processed. Processing continues until either the end of the list is reached, an error occurs in the processing of a list item, or a model-dependent timeout is exceeded. Processing for each list item is as follows:

The directory entry containing the name is located.

When the data is locked for castout and the value of the castout lock matches the value of the local-cache identifier, the castout lock and the castout lock state are set to zero (1001), and the user-data field is stored in the directory entry (1002).

If the change bit and the change-bit overindication (CBO) are both zeros, the directory entry is removed from the castout-class queue (1003). This only occurs if the castout lock state was set in a 'read for castout' state ('01'b) state as a result of a prior store-in cache write operation. Store-multiple write commands (write and register and write when registered) that set the castout lock to the 'write with castout' state ('10'b) do not queue the directory entry on a castout class queue.

If the change bit is zero and if the change-bit overindication is one, the change bit is set to one (1004). Note that the change-bit over-indication is only honored for an entry which is locked for castout in a 'read for castout' state. Processing is complete for the list item. The next list item is processed. If the end of the list is reached (1005), the command is completed, and a completion response code is returned (1006).

When the name is assigned to the directory and the castout lock does not match the value of the local-cache identifier (1007), the item is not processed. The value of the castout lock is placed in the castout-lock-value response operand and the value of the castout lock state is returned in the castout lock state response operand (1009). No further processing occurs, and the response is returned.

When a model-dependent timeout is exceeded (1010), a response code indicating the time out is returned (1012).

When the name is not assigned to the directory (1013), the item is not processed. No further processing occurs, and the response is returned (1015).

Figure 16:
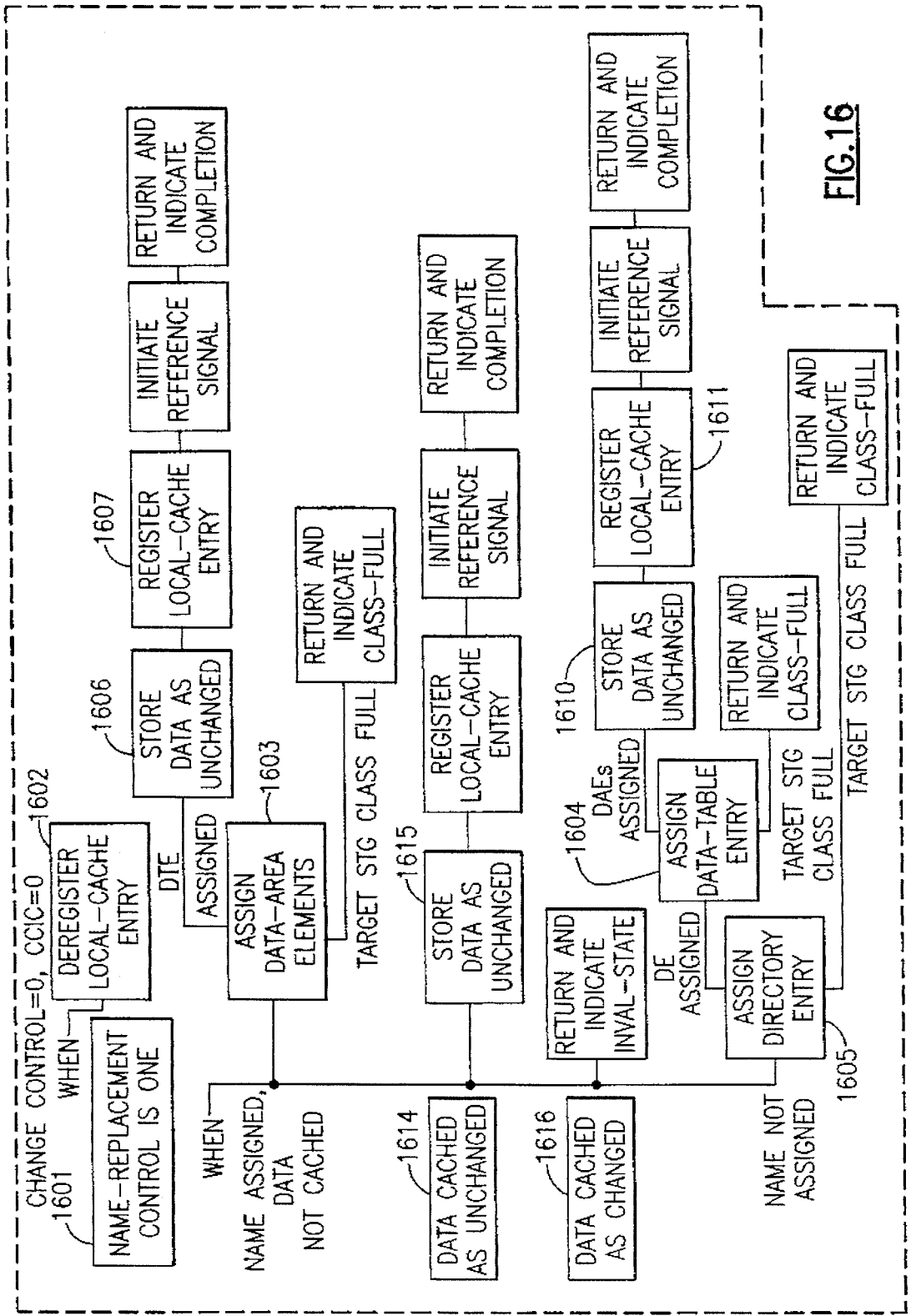
FIG. 16 provides flow diagrams that represent a write and register command when the SES change control indicates an unchanged record state for a store-in cache.
Figure 17:
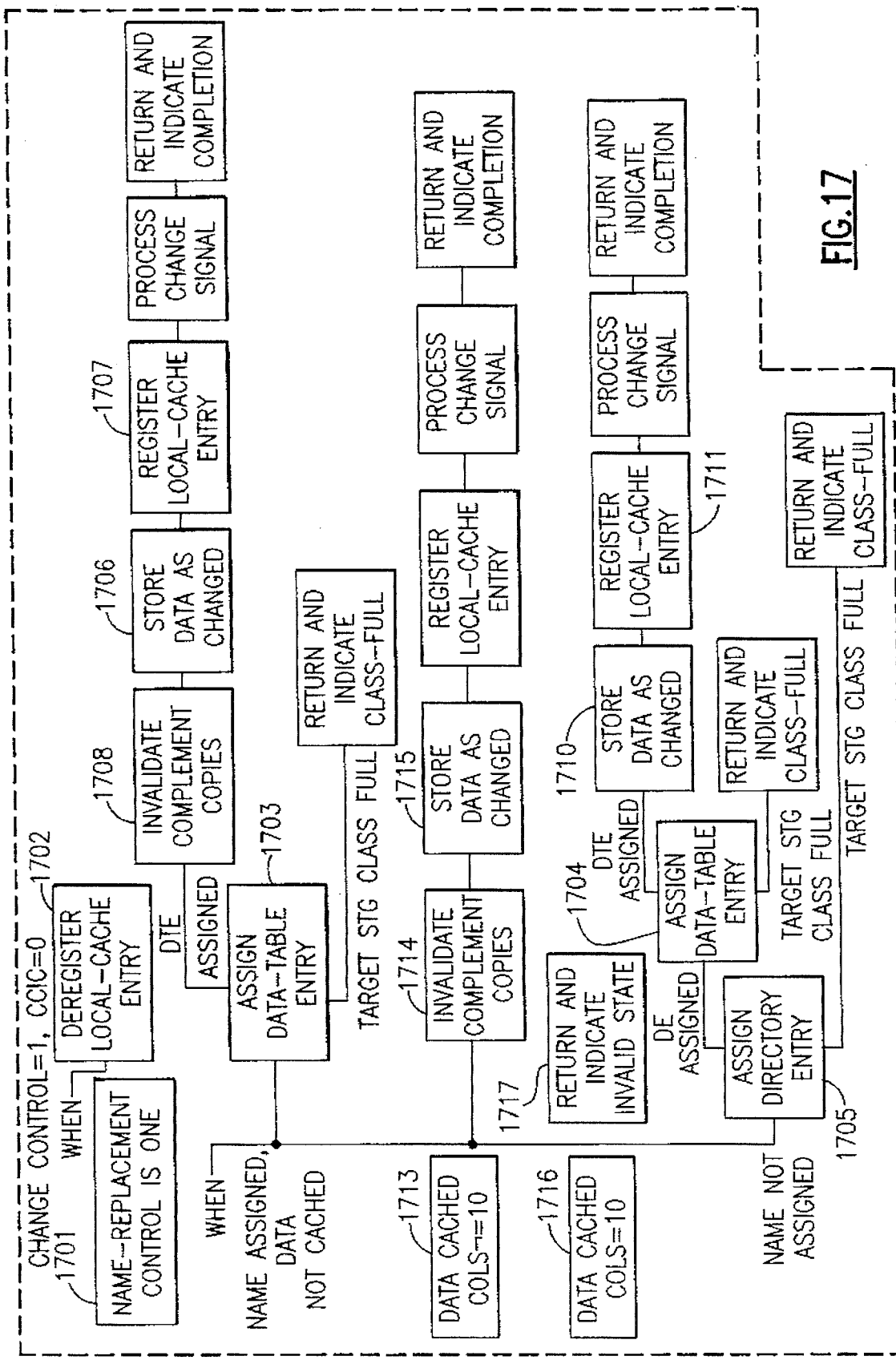
FIG. 17 provides flow diagrams that represent a write and register command when the SES change control indicates a changed record state for a store-in cache.

Write and Register store-in cache request:

FIGS. 16 and 17 are process flow diagrams of the Write and Register command when processing a store-in cache request.

This is indicated by either having set the change bit request operand to '1'b to indicate the data is being written changed, or by setting the change bit to '0'b to indicate unchanged data and specifying invalidate complement copy processing is not to be performed. This is indicated by setting the complement-copy invalidation control operand to '0'b.

The write-and-register command stores the contents of the data block in the data area and registers the local-cache entry when the change control is compatible with the change state of the data.

The write-and-register command also assigns a directory entry whenever the name is not currently assigned to the directory.

When the name-replacement-control request operand (NRC) is one (1601 and 1701), the local-cache entry designated by the replacement-name and local-cache-identifier request operands is deregistered (1602 and 1702). When the name-replacement control is zero, no deregistration is performed.

When the data is not cached, a data area is assigned (1603, 1604, 1703, and 1704). The name may or may not be assigned to the directory. If not, then a name assignment is also made (1605 and 1705). If the assignments are successful, the data is written to the SES cache unchanged when the change control is zero (1606 and 1610) and is written changed when the change control is one (1706 and 1710). The local-cache entry is registered (1607, 1611, 1707, 1711).

When the data is already cached as unchanged (1614), which is indicated by the change bit in the directory entry being zero and the castout lock not being held, the data is written unchanged if the change control is zero (1615).

When the data is already cached as changed and the change control is zero (1616), the data is not written, and the local-cache entry is not registered. The change control is incompatible with the change state of the data. The command is completed and an exception response code is returned with the change bit, castout lock and castout lock state values.

When the data is already cached and the change control is one, processing is directed by the setting of the castout lock and the castout lock state value in the directory entry.

If the castout lock is held in a 'write with castout' state '10'b (1716), then the store-in write change request is incompatible with an ongoing store-multiple write update operation already in progress. The command is completed and an exception response code is returned (1717) with the change bit, castout lock and castout lock state values.

When the change control is one and the data is cached in a compatible state (1713), then copies of the data in other local caches are invalidated through the invalidate complement copies processing (1714), the data is written changed (1715) and a successful response code is returned. The data is cached compatibly with a change control of one if the data is unchanged, is changed but not locked for castout, or is locked for castout in a 'read for castout' state.

Figure 15A:
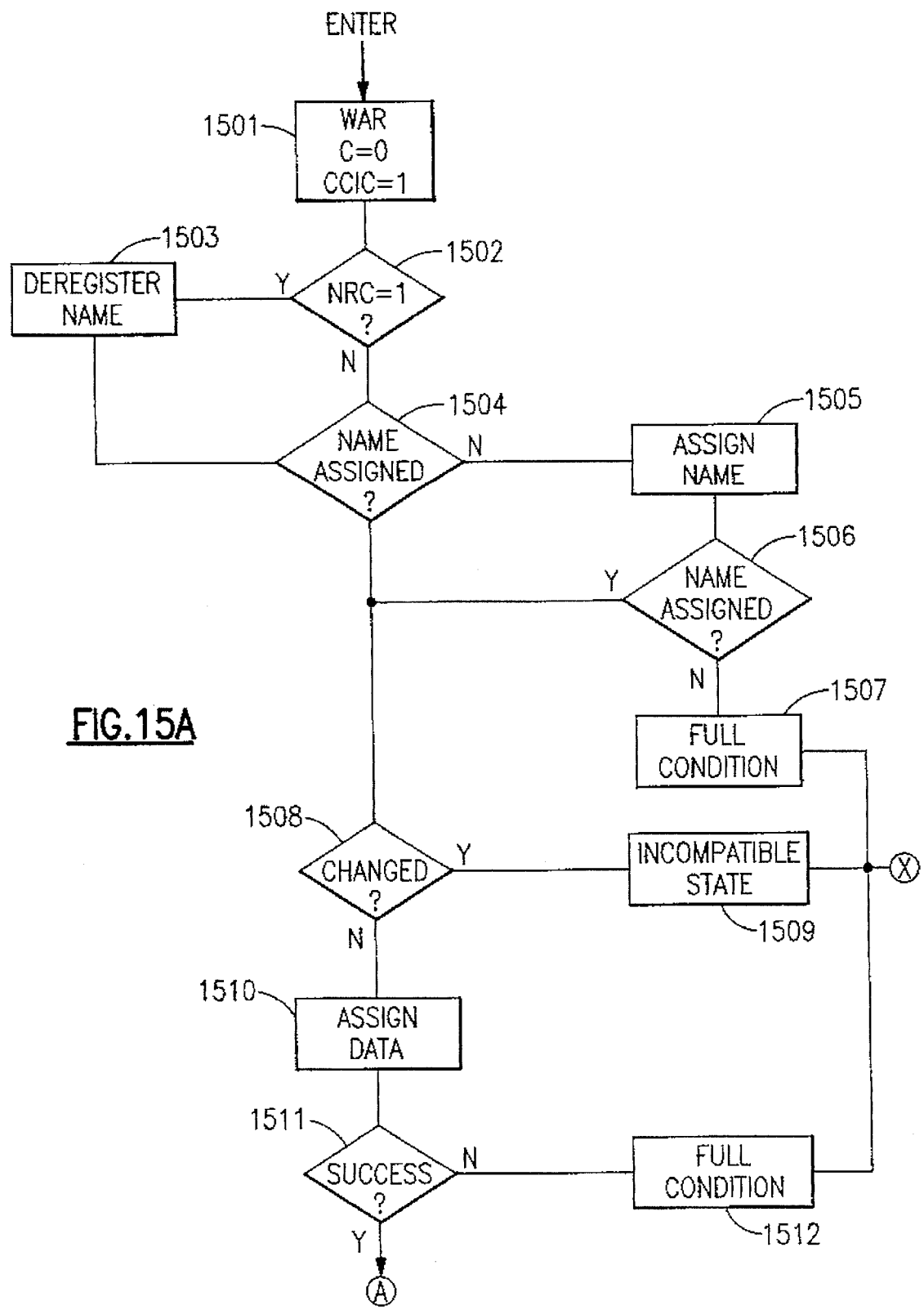
FIGS. 15A and 15B provide a flow diagram that represents a write and register command for a store-multiple cache.
Figure 15B:
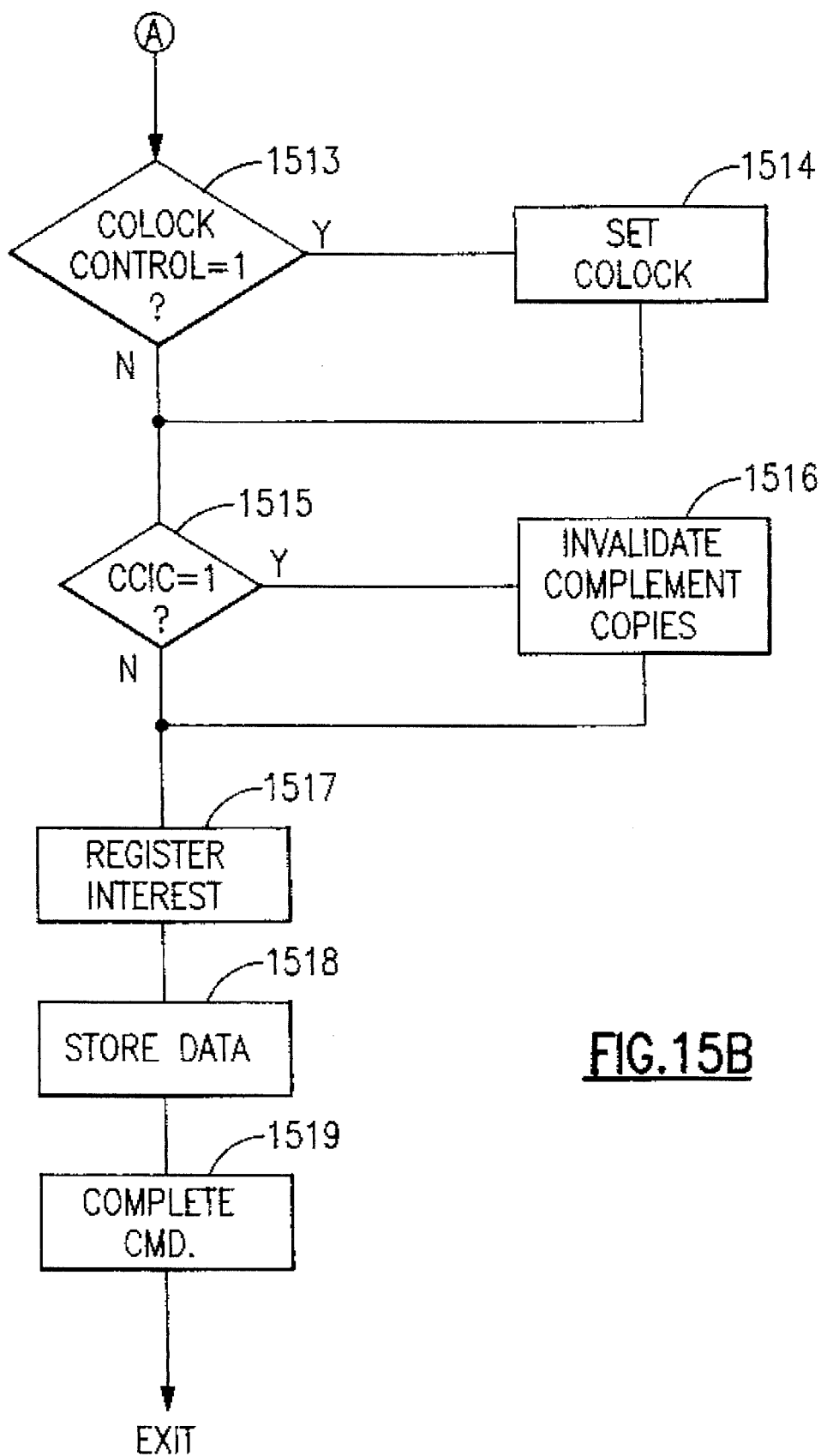

Write and Register store-multiple cache request:

FIG. 15A and 15B is a process flow diagram of the Write and Register command when processing a store-multiple cache request.

This is indicated by having set the change bit request operand to '0'b to indicate the data is being written unchanged and requesting that invalidate complement copy processing is to be performed. This is indicated by the requesting program by setting the complement-copy invalidation control operand to '1'b (1501). The write-and-register command stores the contents of the data block in the data area and registers the local-cache entry when the change control is compatible with the change state of the data.

The write-and-register command also assigns a directory entry whenever the name is not currently assigned to the directory.

When the name-replacement-control request operand (NRC) is one (1502), the local-cache entry designated by the replacement-name and local-cache-identifier request operands is deregistered (1503). When the name-replacement control is zero, no deregistration is performed.

When the data is not cached, a data area is assigned (1510). The name may or may not be assigned to the directory (1504). If not, then a name assignment is also made (1505). If the assignments are not successful (1511 and 1506), an error response is returned to the program (1507 and 1512).

When the data is already cached as unchanged (1508), which is indicated by the change bit in the directory entry being zero and the castout lock not being held, the data is written unchanged if the change control is zero (1518).

When the data is already cached as changed, i.e. the change bit is set in the directory entry or the castout lock is held (1508), the data is not written, and the local-cache entry is not registered. The change control is incompatible with the change state of the data. The command is completed and an exception response code is returned (1509) along with the change bit, castout lock and castout lock state values.

If the castout lock control operand is '1'b, then the command requires the castout lock serialization to be held for the store-multiple write (1513). The castout lock is set to the requested castout lock value as indicated in the LCID and Castout Process ID (CPID) request operands and the castout lock state is set to '10'b (1514). If the complement-copy-invalidation control is '1'b (1515), copies of the data in other local caches are invalidated through the invalidate complement copies processing (1516). The data is then written with the change bit set to zero and a successful response code is returned (1519).

Write When Registered store-in cache request:

FIG. 18 is a process flow diagram of the Write When Registered command when processing a store-in cache request.

This is indicated by either having set the change bit request operand to '1'b to indicate the data is being written changed, or by setting the change bit to '0'b to indicate unchanged data and specifying invalidate complement copy processing is not to be performed. This is indicated by setting the complement-copy invalidation control operand to '0'b.

The write-when-registered command stores the contents of the data block in the data area, provided the name is assigned in the directory, the local-cache entry is registered, and the change control is compatible with the change state of the data.

When the local-cache entry is registered and the data is not cached (1801 and 1802), a data area is assigned (1803 and 1804). If the assignment is successful and the change control is zero (1805), the data is written unchanged. If the assignment is successful and the change control is one (1806), the data is written changed and all other local cache copies of the data are made invalid through the invalidate complement copies process (1807).

When the local-cache entry is registered, the data is already cached as unchanged (1809), and the change control is zero (1810), the data is written unchanged.

When the local-cache entry is not registered (1812 and 1813), the command is completed and an exception response code is returned.

When the local-cache entry is registered, the data is already cached as changed (as indicated by the change bit being set in a changed state or the castout lock being held), and the change control is zero (1814), the data is not written. The change control is incompatible with the change state of the data. The command completes with an error response and the change bit, castout lock and castout lock state values are returned to the program.

When the local-cache entry is registered, the data is already cached, and the change control is one (1815), processing is directed by the setting of the change bit, the castout lock and the castout lock state value in the directory entry.

When the change control is one and the castout lock is held in a 'write with castout' state '10'b (1816), then the store-in write change request is incompatible with an ongoing store-multiple write update operation already in progress. The command is completed and an exception response code is returned (1817), along with the change bit, castout lock, and castout lock state values.

When the change control is one and the data is cached in a compatible state (1815), then copies of the data in other local caches are invalidated through the invalidate complement copies processing (1808), the data is written changed (1811) and a successful response code is returned. The data is cached compatibly with a change control of one if the data is unchanged, is changed but not locked for castout, or is locked for castout in a 'read for castout' state.

Write When Registered store-multiple cache request:

FIGS. 19A and 19B is a process flow diagram of the Write When Registered command when processing a store-multiple cache request.

This is indicated by having set the change bit request operand to '0'b to indicate the data is being written unchanged, and specifying invalidate complement copy processing is to be performed. This is indicated by the requesting program by setting the complement-copy invalidation control operand to '1'b (1901).

The write-when-registered command stores the contents of the data block in the data area, provided the name is assigned in the directory, the local-cache entry is registered, and the change control is compatible with the change state of the data.

When the local-cache entry is not registered (1902) the command is completed and an exception response code is returned (1903).

When the data is already cached as changed, i.e. the change bit is set in the directory entry or the castout lock is held (1904), the data is not written, and the local-cache entry is not registered. The change control is incompatible with the change state of the data. The command is completed and an exception response code is returned (1905), with the change bit, castout lock and castout lock state values.

When the data is not cached, a data area is assigned (1906). If the assignment is not successful (1907) an error response is returned to the program (1908).

If the castout lock control operand is '1'b, then the command requires the castout lock serialization to be held for the store-multiple write (1909). The castout lock is set to the requested castout lock value as indicated in the LCID and Castout Process ID (CPID) request operands and the castout lock state is set to '10'b (1910).

If the complement-copy-invalidation control is '1'b (1911), copies of the data in other local caches are invalidated through the invalidate complement copies processing (1912). The data is then written with the change bit set to zero (1913) and a successful response code is returned (1914).

Processing Overview for store-multiple Caching of Shared Data in a SES Cache:

An example of the operation of the invention will now be explained. Given the commands and processing described above, the example will show how the invention provides the critical cache coherency and serialization primitives required for exploitation of the SES cache as a store-multiple cache. It will further be observed that the mechanisms provided allow the program to ensure referential integrity of read operations against uncommitted store-multiple write changes. In addition, key recovery constructs provided by the methods of the invention are shown to be provided without requiring a global entry-level program locking mechanism to serialize recovery cleanup for failed writers.

Figure 20A:
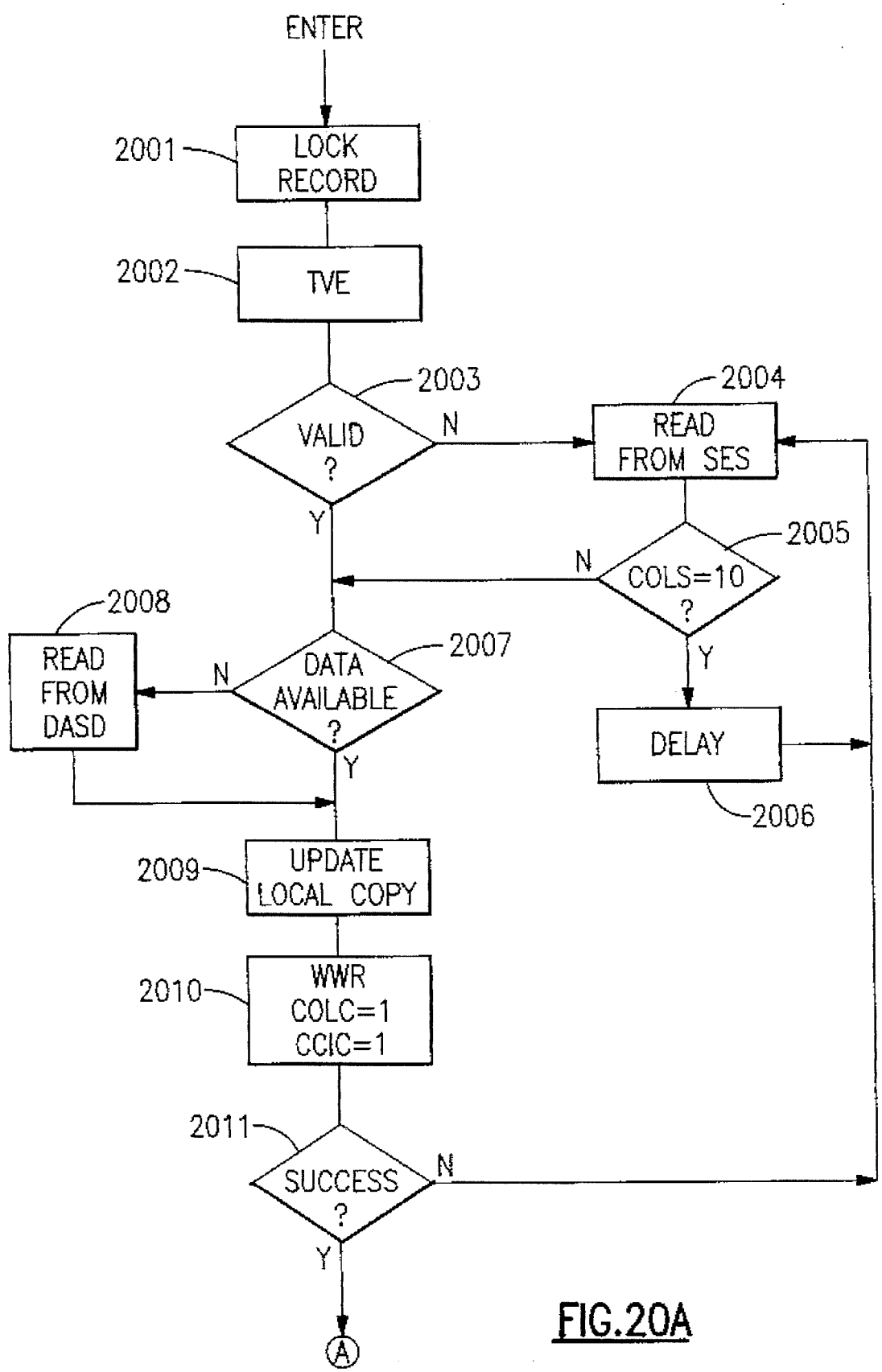
FIG. 20 and 20B is an overview flow diagram of buffer manager processing for a store-multiple cache.
Figure 20B:
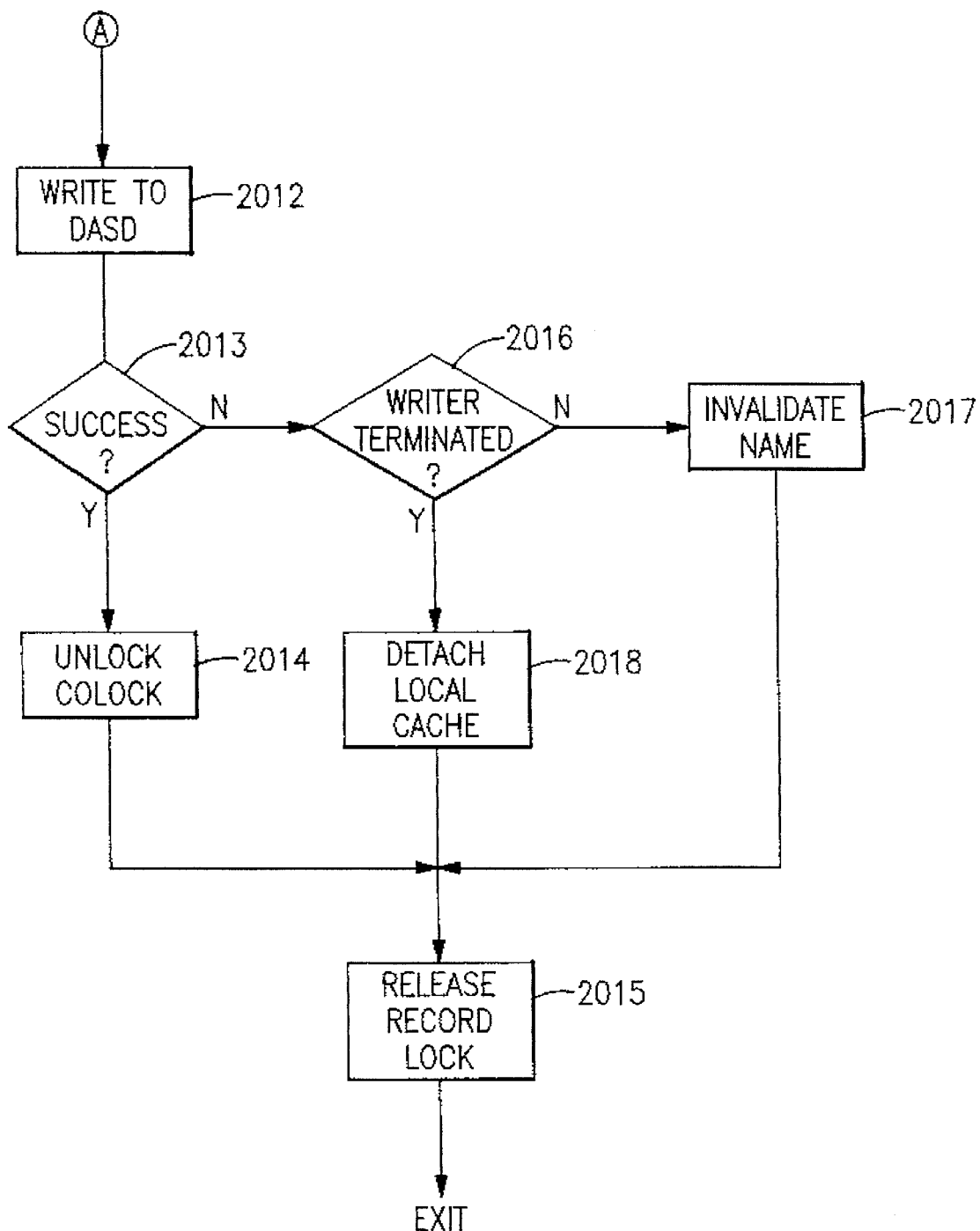

Referring to FIG. 20A and 20B, a program supporting only a granular record-level locking protocol for read and write update process acquires a record lock on the record to be processed (2001). The exact nature of the locking mechanism is not pertinent to this invention and there are many such mechanisms known in the art.

Under the record-lock serialization, the program issues a Test Vector Entry instruction (2002) to determine if a locally cached copy of the page containing the subject record is current or not (2003). If the local copy is not valid, the program issues a Read and Register command (2004) to register interest in the page containing the subject record and to retrieve the page from the SES cache if it is present.

If the response information returned from the Read and Register command indicates that the castout lock is held and the castout lock state indicates "write with castout" state (2005), the program delays using the returned data until the concurrent store-multiple write operation is completed. The program delays for a reasonable period of time to allow the write to finish (2006) and then retries the Read and Register operation (2004).

When the store-multiple write operation completes successfully and the writer unlocks the castout lock serialization, or the writer fails and detach processing invalidates the directory entry, the Read and Register request response will indicate that the castout lock is no longer held at (2005) and the program will proceed to determine from the response information if the data has been returned for the page from the SES cache. If the data was already current in the local buffer, or has now been returned by Read and Register (2007), the program proceeds to update the record contents in its local buffer (2009).

If the data was not available in the SES cache, then the program reads the page from DASD (2008) and proceeds to update the record contents in its local buffer (2009). Completing the local update, the program issues a Write When Registered command to the SES cache requesting that the castout lock be set for the entry in SES and also specifying that complement-copy invalidation should be performed to invalidate all other sharing program's down-level versions of the same page (2010).

If the entry has been updated by another program since the Read and Register was done by this program, then the WWR will fail (2011) due to the cache coherency mechanisms provided via the SES directory entry local cache register.

If the WWR is successful in storing the update to the SES cache entry (2012), the program can proceed to write the updated page to DASD (2013), holding only the record-level lock, since entry-level serialization has been established by means of setting the castout lock in a 'write with castout' state.

When the write to DASD has been completed, the program can consider the store-multiple write complete, having hardened the update in both the SES cache and backing DASD. At this point the program issues the Unlock Castout Locks command (2014) to release the castout lock, making it available to other programs delaying their read/write operations against the same page. The program then releases its record lock on the record just updated and exits the store-multiple cache write process (2015).

If, on the other hand, the write operation to DASD fails (2013), not due to a failure of the program but rather an error in accessing the device, the program issues the Invalidate Name command (2017) to cause the partially written store-multiple update, still resident in the SES cache, to be discarded and all local copies of the data to be invalidated. If the reason for DASD write failure was due to an abnormal termination of the program (2016), then the operating system will issue a Detach Local Cache command at (2018) to clean up any SES cache resources held by the program at the time of the failure. For entries locked for castout in the 'write for castout' state, this will include invalidating the directory entry and performing local-copy invalidation for all registered local caches. This of course releases the castout lock for those entries as well. The entry is now available for access by other read/write processes.

It should be understood that the above-described embodiments of this invention are presented as examples and not as limitations. Modification may occur to those skilled in the art. Accordingly, the invention is not to be regarded as being limited by the embodiments disclosed herein, but as defined by the appended claims.

Having thus described our invention, what we claim as new, and desire to secure by Letters Patent is:

1. A coordination method for writing shared data in a computer sysplex having a plurality of central processor complexes (CPCs) having local storages containing local caches, direct access storage devices (sysplex DASDs) connected to the CPCs for storing data items sharable among the CPCs in the sysplex, and at least one shared electronic storage (SES) connected to some or all CPCs in the sysplex, the write coordination method comprising the steps of:

command signalling a write command by a CPC to a SES to access a SES directory entry associated with a new data version of a data item contained in the CPC, writing an unchanged state indication in the SES directory entry for the new version in response to the write command, writinq the new version of the data item from the CPC to the sysplex DASD in coordination with the SES directory entry, and optionally writing the data item in a SES data area in the SES if indicated by the write command, SES requesting CPC invalidation of each copy (complement copy) of the data item in the CPCs for coordinating the execution of the write command, except not invalidating a copy associated with the signalling Step in the CPC sending the write command, setting into the SES directory entry a write-for-castout indication and a lock indication for identifying the CPC sending the write command and to lock the SES directory entry, executing by the CPC an I/O transfer of the data item from the CPC to the sysplex DASD in response to the CPC receiving a command acceptance signal from the SES, lock-release signalling by the CPC to the SES in response to the CPC receiving a successful I/O write completion signal from the sysplex DASD, and resetting by the SES to an unlocked state the write-for-castout indication and the lock indication in the SES directory entry in response to the lock-release signalling step to allow other CPC commands to access the SES directory entry and to control accessing of any copy of the data item in the SES which may or may not be storing a copy of the data item.

2. A write coordination method in a sysplex as defined in claim 1, further comprising the step of:

sensing for a locked state in the SES directory entry in response to the command signalling step, SES rejecting the command if a lock state is found, and SES accepting the command if acceptance conditions are indicated in the SES directory entry including an unlocked state, and response signalling by SES to the CPC the SES command acceptance signal or a SES command rejection response signal in response to the sensing step.

3. A write coordination method in a sysplex as defined in claim 2, the command signalling step further comprising the step of:

executing a write-and-register command or a write-when-registered command as the write command.

4. A write coordination method in a sysplex as defined in claim 1, the SES writing step further comprising the step of:

SES writing in the SES directory entry an unchanged indication in a change field for the write command, and writing a lock indication in a castout-lock-state field in the SES directory entry.

5. A write coordination method in a sysplex as defined in claim 4, further comprising the steps of:

sensing the castout-lock-state field in the SES directory entry when the write command is received by SES from a CPC for the SES directory entry, and rejecting the write command by SES if a write-for-castout state indication is found in the castout-lock-state field for indicating the entry is currently locked for another command doing a store-multiple write operation.

6. A write coordination method in a sysplex as defined in claim 4, further comprising the steps of:

rejecting by SES of commands specifying the setting of the castout-lock indication while the SES directory entry is locked.

7. A write coordination method in a sysplex as defined in claim 4, further comprising the steps of:

command signalling a read command by a CPC to SES to access the data item in the SES data area associated with the SES directory entry for reading an associated data item from SES to the CPC, and returning to the CPC a state indication for indicating the content of the castout-lock-state field in the SES directory entry.

8. A write coordination method in a sysplex as defined in claim 7, further comprising the steps of:

blocking use of the data item received by the CPC from SES when the returned state indication for the castout-lock-state field is a write-for-castout indication.

9. A write coordination method in a sysplex as defined in claim 1, the invalidating step further comprising the steps of:

SES identifying a CPC location for each complementary copy registered with the SES directory entry, and SES sending an invalidate-complement-copy signal to each identified CPC location having a complement copy to be invalidated except the CPC location associated with the write command.

10. A write coordination method in a sysplex as defined in claim 4, further comprising the steps of:

detecting by a non-failing CPC of a failing CPC in the sysplex, sending by the non-failing CPC of a detach-local-cache (DLC) command to SES, examining by the DLC command of a collection of SES directory entries in each SES directory to locate each SES directory entry containing a lock indication identifying the failing CPC, interrogating the castout-lock-state field in each located SES directory entry, and if the castout-lock-state field is set to a read-for-castout indication, resetting the castout-lock field and the castout-lock state, and setting the SES directory entry to contain a changed indication.

11. A write coordination method in a sysplex as defined in claim 4, further comprising the steps of:

detecting by a non-failing CPC of a failing CPC in the sysplex, sending by the non-failing CPC of a detach-local-cache (DLC) command to SES, examining by the DLC command of a collection of SES directory entries in each SES directory to locate each SES directory entry containing a lock indication identifying the failing CPC, interrogating the castout-lock-state field in each located SES directory entry, and if the castout-lock-state field is set to a write-for-castout indication, invalidating the SES directory entry and invalidating any copy of the data item in every CPC.

12. A write coordination method in a sysplex as defined in claim 4, further comprising the steps of:

CPC sending a read-for-castout (RFC) command to SES,

SES responding to the RFC command by setting a read-for-castout indication in the castout-lock-state field, setting a lock indication in the castout-lock field for identifying the CPC-source of the command, and sending to the CPC any SES-stored data item associated with the SES directory entry only if the lock indication in the SES directory entry is set to a reset state indicating the SES directory entry is not currently locked, and SES not sending the data to the CPC if the SES directory entry contains the lock indication.

* * * * *